United States Patent
Richardson et al.

(10) Patent No.: US 6,249,802 B1
(45) Date of Patent: Jun. 19, 2001

(54) METHOD, SYSTEM, AND COMPUTER PROGRAM PRODUCT FOR ALLOCATING PHYSICAL MEMORY IN A DISTRIBUTED SHARED MEMORY NETWORK

(75) Inventors: John L. Richardson, Santa Barbara; Luis Stevens, Milipitas, both of CA (US)

(73) Assignee: Silicon Graphics, Inc., Moutain View, CA (US)

( * ) Notice: Subject to any disclaimer, the term of this patent is extended or adjusted under 35 U.S.C. 154(b) by 0 days.

(21) Appl. No.: 08/933,829

(22) Filed: Sep. 19, 1997

(51) Int. Cl.[7] .............................. G06F 13/22; G06F 15/17
(52) U.S. Cl. ....................... 709/200; 709/213; 709/214; 709/216; 709/220; 709/226; 709/235
(58) Field of Search ................................. 709/213, 214, 709/216, 220, 226, 235, 225, 241, 224, 248; 711/147, 148, 170, 156; 370/396, 468; 714/4

(56) References Cited

U.S. PATENT DOCUMENTS

| 4,823,111 | 4/1989 | Tsuchiya et al. | ............... 340/825.05 |
| 4,855,903 | * 8/1989 | Carleton et al. | ..................... 709/248 |

(List continued on next page.)

FOREIGN PATENT DOCUMENTS

0478131A2 * 12/1991 (EP) .

OTHER PUBLICATIONS

Coxeter, H.S.M., *Regular Polytopes*, 3rd Edition, Dover, 1973 (entire book provided).
Hwang, K., *Advanced Computer Architecture: Parallelism, Scalability, Programmability*, McGraw–Hill, 1993, entire book provided.
Lenoski, D. and Weber, W.D., *Scalable Shared–Memory Multiprocessing*, Morgan Kaufman Publishers, 1995, pp. xi–xv, 1–40, 87–95, 143–203 and 311–316.
"A Smaby Group Strategic Analysis: SGI/CRAY Link Up For The Next Challenge", Smaby Group, Inc., 1996, pp. 1–6, printed from http://www.smaby,com/sgicray.html on Apr. 16, 1997.

(List continued on next page.)

*Primary Examiner*—Mark H. Rinehart
*Assistant Examiner*—Almari Romero
(74) *Attorney, Agent, or Firm*—Sterne, Kessler, Goldstein & Fox, P.L.L.C.

(57) ABSTRACT

A method, system, and computer program product for allocating physical memory in a distributed shared memory (DSM) network is provided. Global geometry data is stored that defines a global geometry of nodes in the DSM network. The global geometry data includes node-node distance data and node-resource affinity data. The node-node distance data defines network distances between the nodes for the global geometry of the DSM network. The node-resource affinity data defines resources associated with the nodes in the global geometry of the DSM network. A physical memory allocator searches for a set of nodes in the DSM network that fulfills a memory configuration request based on the global geometry data. The memory configuration request can have parameters that define at least one of a requested geometry, memory amount, and resource affinity. The physical memory allocator in an operating system searches the global geometry data for a set of the nodes within the DSM network that fulfill the memory configuration request and minimize network latency and/or bandwidth. During the search, each node can be evaluated to ensure that the node has sufficient available memory amount and resource affinity. The physical memory allocator can begin a search at locations which are determined based on CPU load, actual memory usage or pseudo-randomly. Faster search algorithms can be used by approximating the DSM network by Boolean cubes.

42 Claims, 13 Drawing Sheets

U.S. PATENT DOCUMENTS

| | | | |
|---|---|---|---|
| 5,093,913 | | 3/1992 | Bishop et al. ..................... 711/170 |
| 5,161,156 | * | 11/1992 | Baum et al. . |
| 5,228,127 | | 7/1993 | Ikeda et al. ..................... 395/200.55 |
| 5,237,673 | | 8/1993 | Orbits et al. ..................... 711/170 |
| 5,247,673 | | 9/1993 | Costa et al. ..................... 395/650 |
| 5,247,676 | | 9/1993 | Ozur et al. ..................... 395/650 |
| 5,261,097 | | 11/1993 | Saxon ..................... 395/650 |
| 5,269,013 | | 12/1993 | Abramson et al. ..................... 711/170 |
| 5,325,526 | | 6/1994 | Cameron et al. ..................... 395/672 |
| 5,345,588 | | 9/1994 | Greenwood et al. ..................... 395/650 |
| 5,349,664 | | 9/1994 | Ikeda et al. ..................... 395/652 |
| 5,430,850 | | 7/1995 | Papadopoulos et al. ..................... 395/375 |
| 5,490,274 | | 2/1996 | Zbikowski et al. ..................... 711/112 |
| 5,555,404 | | 9/1996 | Torbjornsen et al. ..................... 707/202 |
| 5,560,029 | | 9/1996 | Papadopoulos et al. ..................... 395/800 |
| 5,590,326 | | 12/1996 | Manabe ..................... 395/477 |
| 5,592,625 | * | 1/1997 | Sandberg ..................... 711/147 |
| 5,671,225 | * | 9/1997 | Hooper et al. ..................... 370/468 |
| 5,692,193 | | 11/1997 | Jagannathan et al. ..................... 395/676 |
| 5,713,002 | | 1/1998 | Zbikowski et al. ..................... 711/112 |
| 5,717,926 | | 2/1998 | Browning et al. ..................... 395/674 |
| 5,727,150 | | 3/1998 | Laudon et al. ..................... 395/200.45 |
| 5,745,652 | * | 4/1998 | Bigus . |
| 5,745,703 | | 4/1998 | Cejtin et al. ..................... 395/200.68 |
| 5,752,031 | | 5/1998 | Cutler et al. ..................... 395/673 |
| 5,761,505 | * | 6/1998 | Golson et al. ..................... 709/225 |
| 5,771,383 | | 6/1998 | Magee et al. ..................... 395/680 |
| 5,784,697 | | 7/1998 | Funk et al. ..................... 711/170 |
| 5,805,593 | * | 9/1998 | Busche ..................... 370/396 |
| 5,862,338 | * | 1/1999 | Walker et al. . |
| 5,864,851 | | 1/1999 | Breitbart et al. ..................... 707/8 |
| 5,870,564 | * | 2/1999 | Jensen et al. ..................... 709/241 |
| 5,909,540 | * | 6/1999 | Carter et al. ..................... 714/4 |
| 5,911,149 | * | 6/1999 | Luan et al. ..................... 711/147 |
| 5,958,010 | * | 9/1999 | Agarwal et al. ..................... 709/224 |
| 5,974,536 | | 10/1999 | Richardson ..................... 712/215 |
| 6,006,255 | * | 12/1999 | Hoover et al. ..................... 709/216 |
| 6,049,853 | * | 3/2000 | Kingsbury et al. ..................... 711/147 |

OTHER PUBLICATIONS

Bolosky, William J. et al., "NUMA Policies and Their Relation to Memory Architecture," *Proceedings of ASPLOS*, Apr. 1991, pp. 212–221.

Cox, Alan L. and Fowler, Robert J., "The Implementation of a Coherent Memory Abstraction on a NUMA Multiprocessor: Experiences with Platinum," *Proceedings of the Twelfth ACM Symposium on Operating Systems Principles*, Dec. 3–6, 1989, pp. 32–44.

LaRowe, Richard P., Jr. and Ellis, Carla S., "Page Placement Policies for NUMA Multiprocessors," *Journal of Parallel and Distributed Computing*, vol. 11, No. 2, Feb. 1991, pp. 112–129.

Catanzaro, Ben, "Multiprocessor System Architectures: A Technical Survey of Multiprocessor/Multithreaded System Using SPARC, Multilevel Bus Architectures, and Solaris (SunOS)", 01/1994, Sun Microsystems, Inc., pp. iii–xxxii and pp. 1–319.*

Kumar et al., "Introduction to Parallel Computing", 1994, Benjamin Cummings Publ., pp. v–xii and 29–48.*

Chandra, R. et al., "Data Distribution Support on Distributed Shared Memory Multiprocessors", 06/1997, Proceedings of the SIGPLAN 97 Conference on Programming Language Design and Implementation, pp. 1–12.*

* cited by examiner

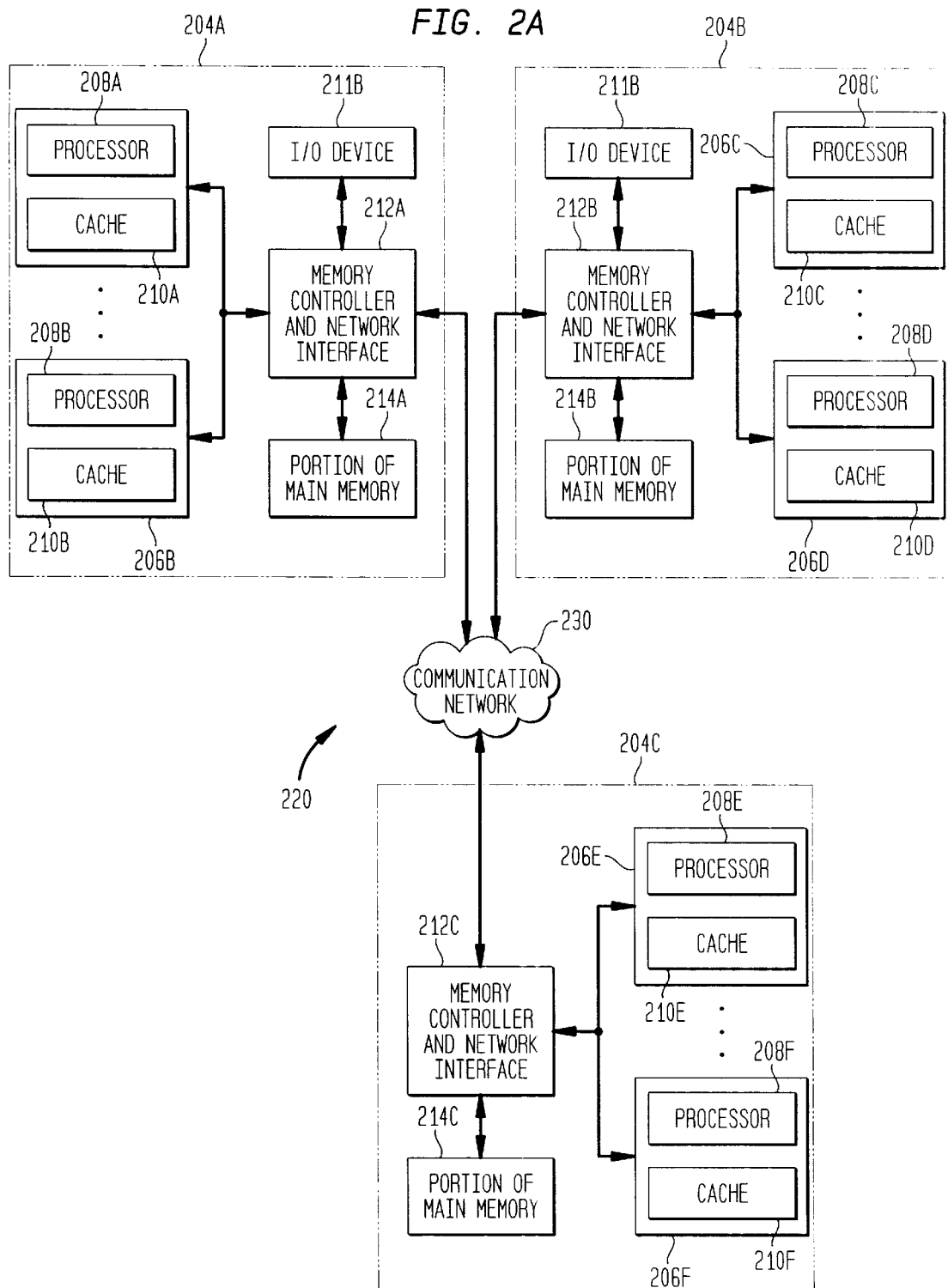

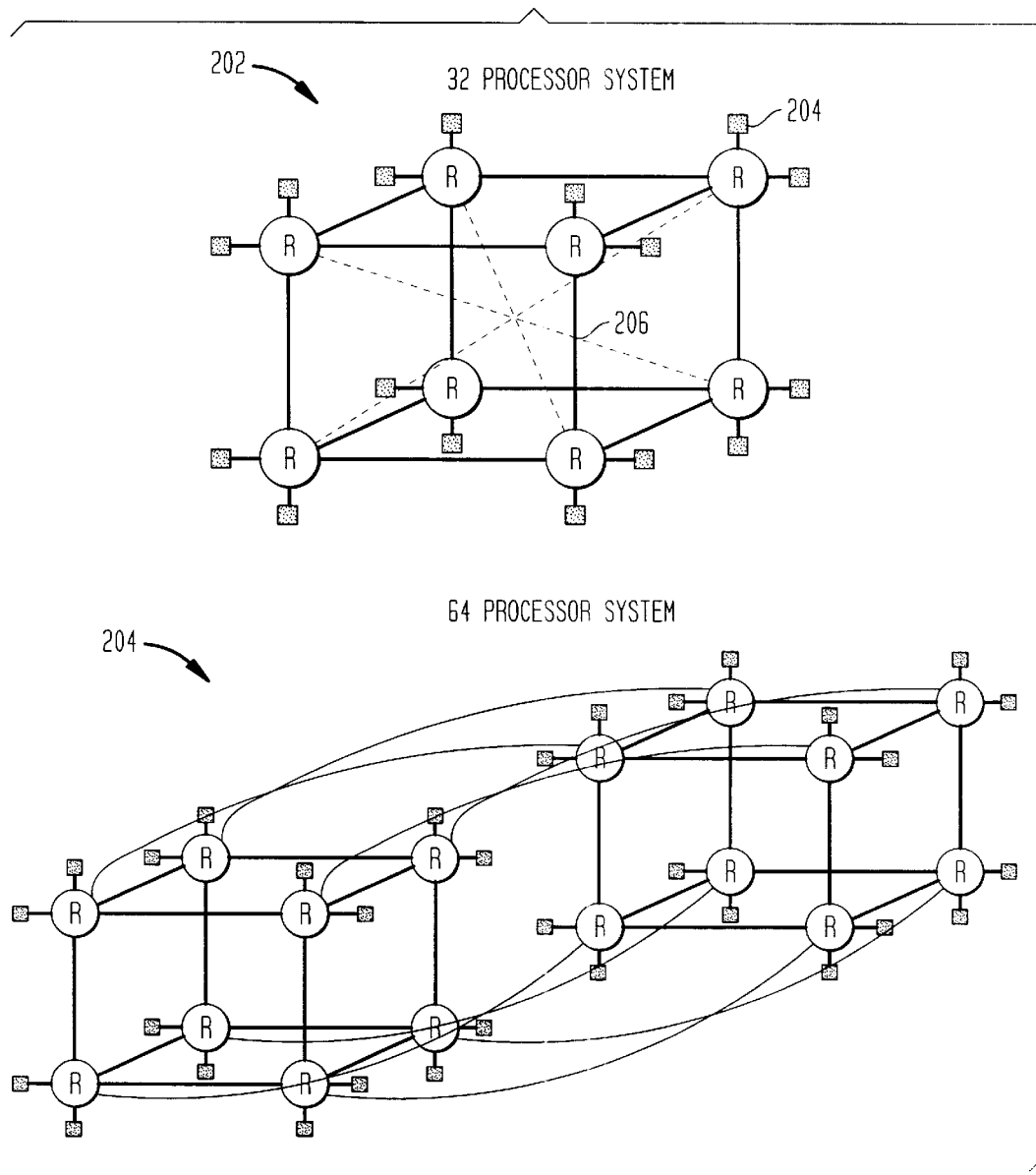

METHOD, SYSTEM, AND COMPUTER PROGRAM PRODUCT FOR ALLOCATING PHYSICAL MEMORY IN A DISTRIBUTED SHARED MEMORY NETWORK

BACKGROUND OF THE INVENTION

1. Field of the Invention

The present invention relates to multiprocessor systems.

2. Related Art

Centralized shared-memory multiprocessor systems, such as, CHALLENGE™ and POWER CHALLENGE™ systems manufactured by Silicon Graphics, Inc., use a common bus to link multiple processors and a single shared memory. Contention for bus bandwidth and memory access can limit the number of processors (also called the CPU count) which can effectively share a common bus. The size of a single shared memory also limits the ability to scale a centralized-shared-memory multiprocessor system to higher CPU counts.

A distributed shared memory (DSM) architecture, such as, a scalable shared-memory system or a non-uniform memory access (NUMA) system, typically includes a plurality of physically distinct and separated processing nodes each having one or more processors, input/output devices and main memory that can be accessed by any of the processors. The main memory is physically distributed among the processing nodes. In other words, each processing node includes a portion of the main memory. Thus, each processor has access to "local" main memory (i.e., the portion of main memory that resides in the same processing node as the processor) and "remote" main memory (i.e., the portion of main memory that resides in other processing nodes). For each processor in a distributed shared memory system, the latency associated with accessing a local main memory is significantly less than the latency and/or bandwidth associated with accessing a remote main memory. See D. Lenoski and W. Weber, *Scalable Shared-Memory Multi-Processing*, Morgan-Kaufmann Publ., U.S.A. (1995), pp. 1–40, 87–95, 143–203, and 311–316, and Hennessy and Patterson, *Computer Architecture: A Quantitative Approach*, Second Edition, Morgan-Kaufmann Publ., U.S.A. (1996), at Chapter 8, "Multiprocessors," pp. 634–760.

On a centralized shared memory system an application's performance is typically not affected by the physical location of memory pages which the application uses. On a distributed shared memory system having non-uniform memory access times, e.g., a NUMA machine, this is not the case. Only the user really understands his or her application's needs and how data should optimally be distributed to minimize communication costs and maximize performance.

SUMMARY OF THE INVENTION

Application programmers, compilers, and other users need to be able to select a particular geometric configuration of memory including, a preferred geometry or topology, memory amount, and resource affinity. The present invention provides a method, system, and computer program product for allocating physical memory in a distributed shared memory (DSM) network. Global geometry data is stored that defines a global geometry of nodes in the DSM network. The global geometry data includes node-node distance data and node-resource affinity data. The node-node distance data defines network distances between the nodes for the global geometry of the DSM network. The node-resource affinity data defines which resources are associated with particular nodes in the global geometry of the DSM network.

According to the present invention, a physical memory allocator searches for a set of nodes in the DSM network that fulfills a memory configuration request based on a search of the global geometry data. The memory configuration request has parameters that define at least one of geometry or topology, memory amount, and resource affinity. The physical memory allocator in an operating system searches the global geometry data for a set of the nodes within the DSM network that fulfill the memory configuration request. After a successful search, physical memory address space can be distributed across the set of nodes in the DSM network in accordance with the memory configuration request.

A user can control the type of search performed. According to one embodiment, the physical memory allocator searches for a set of nodes that represents nodes within the DSM network that fulfills the requested geometry. During the search, each node can be further evaluated to ensure that the node has sufficient available memory amount and proper resource affinity. For example, node memory amount data can be read to verify that the available node memory amount is at least equal to the memory amount specified in the memory configuration request. Node-resource affinity data (e.g. a resource affinity list) can be evaluated to ensure that nodes found in the search are located within an appropriate network distance of a resource in accordance with the resource affinity specified in the memory configuration request.

According to one embodiment of the present invention, the physical memory allocator searches for a set of nodes that represent a solution that minimizes (or approximately minimizes) the following expression:

$$\alpha \sum_{i=0}^{n-1} \sum_{j=0}^{n-1} |G_{P_i P_j} - g_{ij}|^2 + (1-\alpha) \sum_{j=0}^{m-1} |G_{a_i P_{b_j}}|^2$$

over a subset of nodes $\{P_0, P_1, \ldots, P_{n-1}\}$, which can range over combinations of N memory nodes selected n at a time; where N is the number of nodes in the global geometry data G; n is the number of nodes in a geometry g specified in the memory configuration request, m is the number of nodes having a resource affinity in the global geometry, and $\alpha$ is a weighting factor.

According to another feature of the present invention, the physical memory allocator can begin a search at locations which are determined based on CPU load, actual memory usage, or pseudo-randomly. In this way, physical memory is allocated more evenly across a DSM network reducing overall contention and the occurrence of hot spots.

According to another embodiment of the present invention, a user is permitted to specify a geometry g which can be different types of memory topologies in a memory configuration request. In one example, the memory topology can include at least one of the following types of memory topologies: cluster, Boolean cube, Boolean cube fixed, and physical. The physical memory allocator reads the memory configuration request. If cluster memory topology is specified or if no memory topology is specified, the search begins at a selected node. The search expands radially to other nodes located topologically close to the first node based on the global geometry data until a candidate node set is found. Each candidate node is further chosen to minimize the Hamming distance between nodes. The candidate node set consists of a number of nodes equal to the number of nodes specified in the memory configuration request.

If a Boolean cube memory topology is specified, the search finds a candidate imbedded Boolean cube node set.

The candidate imbedded Boolean cube node set consists of a Boolean cube imbedded in the DSM network having a number of nodes equal to the number of nodes specified in the memory topology request. Different orientations of the candidate imbedded Boolean cube node set can be evaluated to check appropriate memory amount and resource affinity.

If a fixed Boolean cube memory topology is specified, the search finds a candidate imbedded Boolean cube node set in a default orientation matching Boolean cube memory topology. If a physical memory topology is specified, the physical memory allocator searches global geometry data for the specified physical memory topology.

According to another feature of the present invention, the physical memory allocator further evaluates available memory amount for each node in the candidate node set to determine whether a successful node set has been found. The step of evaluating available memory at each node can be performed on a per node basis as each node is searched to find a candidate node set, or on per node basis after a candidate node set has been found to determine whether the candidate node set is a successful node set.

According to another feature of the present invention, the physical memory allocator further evaluates resource affinity for each element in the resource affinity list to determine whether a successful node set has been found. The step of evaluating resource affinity at each node can be performed on a per node basis as each node is searched to find a candidate node set, or on per node basis after a candidate node set has been found to determine whether the candidate node set is a successful node set.

The present invention dynamically allocates physical memory on a DSM network according to a memory configuration request. Compilers and libraries can use the present invention to embed arrays and other distributed objects into distributed shared memory to provide efficient data distribution for user applications.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 2A is a block diagram of an example non-uniform memory access (NUMA) computer system for use in the system of FIG. 1A;

FIG. 2C is a diagram depicting examples of multiprocessor systems for use in the system of FIG. 1A;

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Table of Contents

1. Environment
2. Dynamic Physical Memory Allocation
3. Example NUMA System
4. Example Interconnection Networks
5. Searching
6. Optimal Geometric Memory Allocation
   a. Geometry
   b. Resource Affinity
   c. Simplification with Boolean Cubes
7. Example Imbedded Hypercube Search
   a. Preliminaries
   b. Memory Regions: Topology Requests and Memory Affinity requests
   c. Topology Requests
   d. Memory Affinity
   e. Searching for Available Memory
8. Higher Level Memory Topology Specification
9. Example Multiprocessor Memory Management Environment
10. Conclusion 1. Environment According to the present invention, a method, system, and computer program product are provided for dynamically allocating physical memory in NUMA multi-processor computer systems. The physical memory allocator of the present invention can be executed by an operating system for a multi-processor system, such as a NUMA machine.

The present invention is described in terms of an example operating system in a DSM environment. For example, as described further below with respect to FIGS. 10 to 12, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif. Given the description herein, it would be apparent to one skilled in the relevant art how to implement the present invention in any computer system including, but not limited to, an operating system.

Description in these terms is provided for convenience only. It is not intended that the invention be limited to application in this example environment. In fact, after reading the following description, it will become apparent to a person skilled in the relevant art how to implement the invention in alternative environments.

2. Dynamic Physical Memory Allocation

Figure 1A:
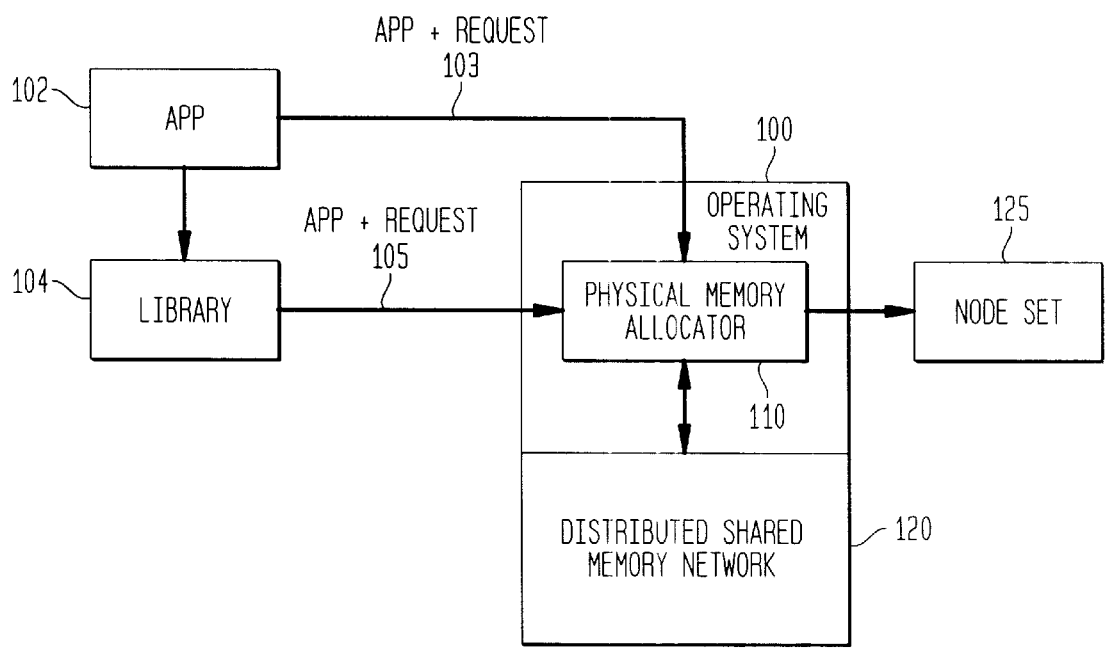
FIG. 1A is a block diagram of a computer system having a physical memory allocator according to the present invention.

FIG. 1A is a block diagram of a system for dynamic physical memory allocation according to the present invention. An operating system 100 controls one or more applications 102 and libraries 104 running on a distributed shared memory (DSM) network 120. Operating system 100 includes a physical memory allocator 110 for dynamically allocating physical memory according to the present invention.

Physical memory allocator 110 receives a memory configuration request from application 102 and/or library 104. Application 102 is written to include memory configuration request(s) compatible with physical memory allocator 110. Application 102 is compiled directly so that operating system 100 can forward each memory configuration request to physical memory allocator 110 (as indicated by arrow 103). Otherwise, library 104 can be used to convert an application 102 which is not compatible into a compatible application program that includes memory configuration requests (as indicated by arrow 105).

Upon receiving a memory configuration request, physical memory allocator 110 performs a search of global geometry data and outputs a node set 125. Node set 125 identifies the set of nodes in DSM network 120 for a successful search that fulfills the memory configuration request. Operating system 100 can then distribute physical memory address space across the set of nodes 125.

Figure 1B:
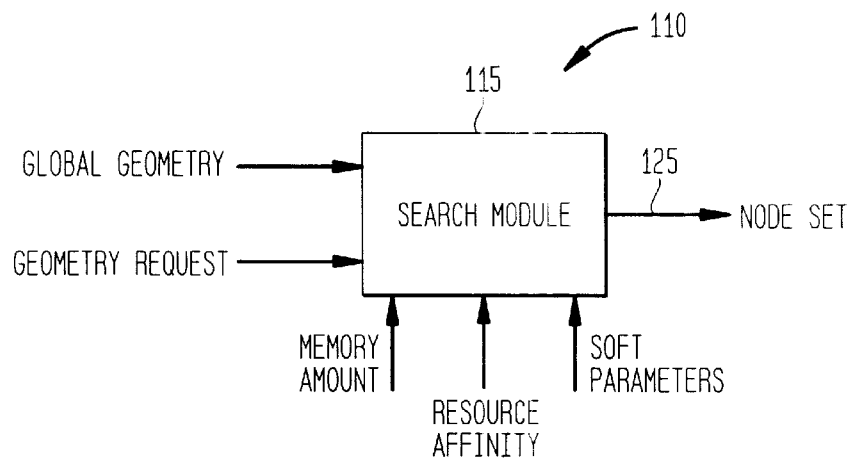
FIG. 1B is a block diagram of a physical memory allocator according to one embodiment of the present invention.

FIG. 1B is a block diagram that shows a search module 115 in physical memory allocator 110. Stored global geometry data is read by search module 115. Stored node memory amount data and node resource affinity data are also read by search module 115. Each memory configuration request includes at least one of the following parameters: geometry, memory amount, resource affinity, and soft parameters for further controlling the search. Search operations performed by search module 115 are described in further detail below with respect to FIGS. 3 to 9. These search operations find an optimal geometry for allocating memory that fulfills a memory configuration request while reducing overall network latency and/or bandwidth. Faster Boolean search algorithms can be used to find an optimal geometry for allocating memory that also fulfills a memory configuration request while reducing overall network latency and/or bandwidth.

It is helpful to first discuss examples of a NUMA system, interconnection network and operating system environment. These examples are provided to assist in the description of dynamic physical memory allocation according to the present invention, not to limit the present invention.

3. Example NUMA System

Figure 2B:
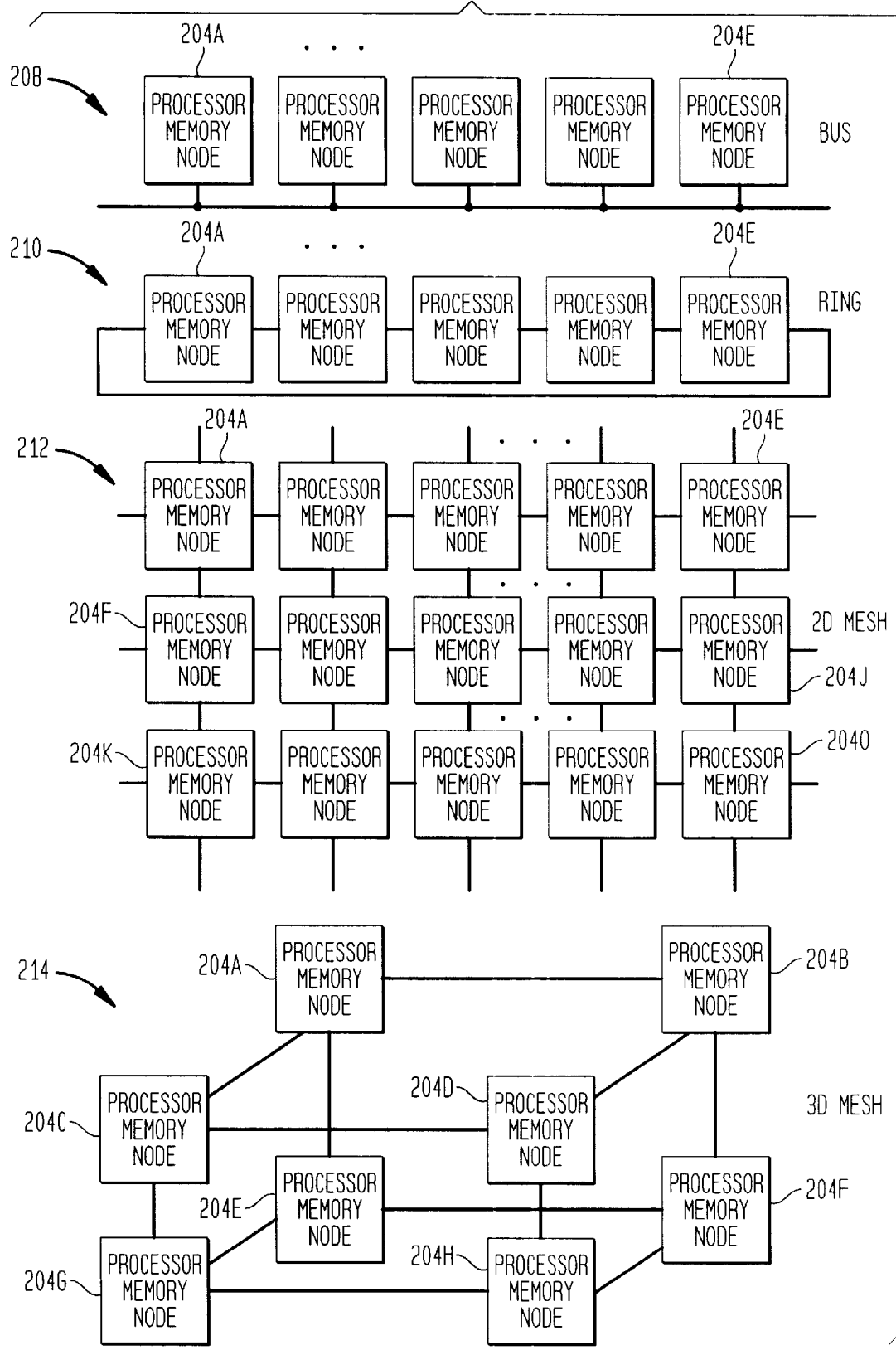
FIG. 2B is a block diagram depicting examples of common interconnection networks for use in the system of FIG. 1A.

FIG. 2A is a block diagram of a non-uniform memory access PUMA) computer system 220. The NUMA computer system 202 includes a plurality of processing nodes 204A–204C, which are physically distinct and physically separated from one another. The processing nodes 204A–204C communicate with each other over a communication network 230, representing any well known data communication network topology, such as a bus, multistage interconnection network, local area network, wide area network, etc., or any combination thereof. Examples of common interconnection network topologies are depicted in FIG. 2B described below.

Each processing node 204A–C includes one or more computing nodes 206A–F. In one example, each processing node 204A–C includes two computing nodes 206A–F as shown in FIG. 2A. In general, each processing node can include any number of computing nodes. Each computing node 206 includes a processor 208 and a cache 210. Each processing node 204 also includes a memory controller and network interface 212. Processors 208 in any particular processing node 204 communicate with other devices connected to the communication network 220 via the memory controller and network interface 212 contained in that processing node 204.

Each processing node 204 also includes a portion of main memory 214. The portions of main memory 214 in all of the processing nodes 204 collectively represent the main memory of the computer system 204. Any processor 208 in any processing node 204, can access data stored in the portion of main memory 214 contained in any of the processing nodes 204. Access to data contained in the portion of main memory 214 of any particular processing node 204 is controlled by the memory controller and network interface 212 contained in that same processing node 204.

4. Example Interconnection Networks

FIG. 2B is a block diagram depicting examples of interconnection networks that can be used as the communication network 220, according to an embodiment of the present invention. FIG. 2B shows a bus system 221, a ring system 222, a 2D mesh system 223 and a 3D mesh system 224. The bus system 221 is used in many conventional computer systems. Using the bus system 221, the processor memory nodes 204A–E communicate to each other by broadcasting messages over the single shared bus. A disadvantage of using the bus system 221, is that the system is not scalable because the bus bandwidth does not increase as additional process or memory nodes 221 are added. In fact, adding processing nodes 204 to the bus system 221 causes a decrease the overall system bandwidth.

In contrast, ring system 222, 2D mesh system 223 and 3D mesh system 224, all provide interconnections that are scalable. That is, adding process or memory nodes 204 to these systems causes an increase to the overall communication bandwidth of the network 220.

Mesh networks 223 and 224 have an additional characteristic in common. Specifically, the time it takes to communicate from one node 204 to another node 204, depends upon the network distance between the nodes 204. That is, the further away one node is from another node, the longer it takes to communicate between the two. This is the reason such systems are referred to an non-uniform memory access systems.

To illustrate this characteristic, the following example is presented. In the following example, it is assumed that the communication time between adjacent nodes 204 is 100 nanoseconds (ns.) in each of the networks depicted in FIG. 2B. Thus, for the ring topology network 222, a message from node 204A to node 204B takes exactly 100 ns. However, a message from 204A to 204E takes 400 ns. because it must first travel through the nodes 204B, 204C, and 204D.

Referring now to the 2D mesh 223, it can be seen that a message between the nodes 204A and 204O takes 600 ns. It should be noted that alternate paths are available using this topology. In general, path redundancy is one of the advantages of using mesh network technology, such as the 2D 223 and the 3D 224 mesh networks. For example, communications between the nodes 204A and 204O can take the path—204A–204B–204C–204D–204E–204J–204O.

Likewise, the alternate path—204A–204F–204K–204L–204M–204N–204O can also be used. As can be seen, there are many other possible paths that can be taken. In this fashion, alternate paths can be taken with other paths are blocked, out of service, congested, or otherwise unavailable.

Likewise, path redundancy exists in the 3D mesh technology, such as the 3D mesh 224. For example, the path 204A–204C–204D–204B can be used to send a message between nodes 204A and 204B. Note that using this path, the communication takes 300 ns to complete. In contrast, by using a shorter path, (e.g., the path 204A–204B), it takes only 100 ns. to complete the same communication.

In a preferred embodiment of the present invention, 3D mesh topology 224 is used for the communication network 220. An example of a 32 and 64 processor system using 3D mesh topology in a so-called "bristled" mesh is shown in FIG. 2C. In this example, a 32 processor system 252 comprises 16 nodes 204, each comprising 2 processors, such as the processor 206 (not shown for clarity in FIG. 2C). Note that in this example, additional links are shown as dotted diagonal lines. These additional links serve to increase the node bandwidth and decrease system access latency by creating shorter paths between the nodes 204. An example of a 64 processor system 254 is also depicted in FIG. 2C.

As stated, the present invention operates in combination with a computer system having memory access times dependent upon the network distance between a requestor node (or "local node") and a server node (or "remote mode"). In the examples used herein, the network distance is described in terms of the number of "hops" between the nodes. For example, referring back to FIG. 2B, the shortest network distance between the nodes 204A and 204K, in the 2D mesh topology 223, is 2 hops (i.e. the path—204A–204F–204K). Likewise the network distance between the nodes 204A and 204F is 1 hop. When memory is being accessed locally, within a single node, the network distance is referred to herein as being 0 hops.

Note that the present invention can be implemented using arbitrary network topologies including those discussed herein, and others not specifically mentioned. However, the definition of the network distance between nodes in any NUMA system will be apparent to those skilled in the relevant art(s). The topologies of a bus system, ring system, and 2D and 3D meshes are used herein for exemplary purposes only and should not be construed to limit the scope and breadth of the present invention.

5. Searching

Figure 3:
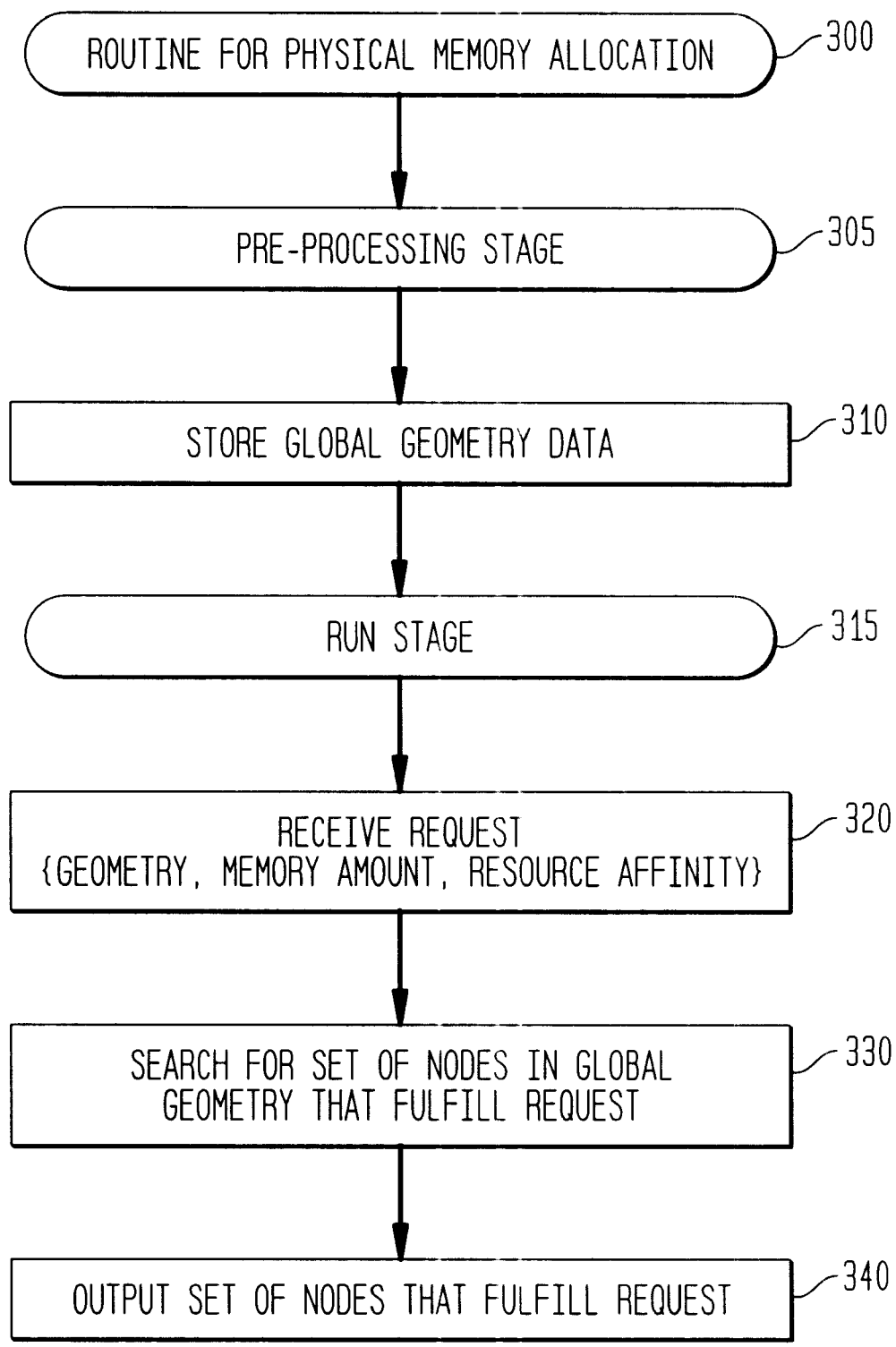
FIG. 3 is a flowchart of a routine for allocating physical memory according to one embodiment of the present invention.

The operation of physical memory allocator 110 will now be described in further detail with respect to FIG. 3. FIG. 3 is a flowchart of a routine for physical memory allocation 300 according to one embodiment of the present invention. In a pre-processing stage 305, global geometry data is stored (step 310). Alternatively, the global geometry data can be stored in real time. The global geometry data defines a global geometry of the nodes in a DSM network 130. Global geometry data can include node-node distance data and node-resource affinity data. Node-node distance data defines network distances between the nodes for the global geometry of the DSM network. Node-resource affinity data defines resources associated with nodes in the global geometry in the DSM network.

Run stage 315 consists of steps 320–340. In step 320, physical memory allocator 110, more specifically the search module 115, receives a memory configuration request. The memory configuration request has one or more of the following parameters: geometry, memory amount, resource affinity, and/or soft parameters. The geometry parameter defines an input geometry requested by a user. The geometry parameters lists at minimum the number of nodes over which physical memory is to be allocated. The geometry parameter can also describe a range of information on a desired geometry or topology of the nodes over which physical memory is to be allocated. For example, the geometry parameters can list the number of nodes and requested geometry or topology information, if any, such as mesh, hypercube, and inter-node network distances or ranges.

The memory amount parameter defines a desired memory amount that a node must have. The resource affinity parameter defines a resource affinity for a node. The following table shows an example of a memory configuration request for the case in which a user wishes to allocate across four nodes in a square arrangement where node A requires one megabyte of memory, node B requires two megabytes of memory, node C requires three megabytes of memory, and node D requires four megabytes of memory, and where node A requires placement near a printer (i.e. at or within a number of hops from a node with a printer):

| Geometry | Memory Amount | Resource Affinity |
| --- | --- | --- |
| 4 nodes, square | 1 MB, 2 MB, 3 MB, 4 MB | node A near printer |

Physical memory allocator 110 reads the memory configuration request of step 320 and searches for a set of nodes within the DSM network that fulfills the memory configuration request (step 330). In particular, search module 115 searches global geometry data for candidate nodes that fulfill the geometry parameter and which minimize internode network distances. When a memory amount parameter is included, search module 115 further evaluates each candidate node to ensure that the node has an available memory amount at least equal to the memory amount specified in the memory configuration request. When a resource affinity parameter is specified in the memory configuration request, search module 115 further evaluates each candidate node to ensure that the candidate node has a resource specified by the resource affinity parameter or is at least sufficiently close to a node having the resource affinity.

According to one feature of the present invention, to avoid contention and hot spots at preferred regions of memory, search module 115 can begin the search in step 330 at a first candidate node which is determined based on CPU load, actual memory usage, or pseudo-randomly. Search module 115 then expands the search to other nodes located close to the first node, based on global geometry data, until a candidate node set is found having a number of nodes equal to the number of nodes specified in the memory topology request. Each candidate node is evaluated to determine whether it has a minimum available memory amount and appropriate resource affinity to fulfill the memory configuration request.

Soft parameters can be included in a memory configuration request to further control the search operation of search module 115, and in particular to accept less than perfect or compromise search solutions. For example, a soft parameter, toggled between "advisory" or "mandatory," can be used to determine whether a search will terminate upon the first successful candidate node set is found (advisory) or whether the search will continue to find a number of or all successful candidate node sets fulfilling a memory configuration request (mandatory). The number of successful candidate node sets are then evaluated to select an optimum successful candidate node set that minimizes network distances between nodes and minimizes the distance between nodes and available resources in the DSM network 130.

Finally, in step 340, the set of nodes 125 that fulfill a memory configuration request are output. Physical memory can then be distributed by an operating system across the set of nodes 125.

According to one embodiment of the present invention, searching step 330 involves a search for a set of nodes that represent an optimal geometry as described in further detail below. According to another embodiment of the present invention, searching step 330 can be simplified by approximating the DSM network with Boolean cubes as described with respect to search routine 400 and FIGS. 4 to 9 below.

6. Optimal Geometric Memory Allocation a. Geometry

Consider a distributed memory machine with N memory nodes. Every node is labeled by a unique integer j where $j \in \{0, 1, \ldots, N-1\}$. The global geometry of an N node machine is described by a N by N distance metric $G_{ij}$. For any two nodes $i,j \in \{0, 1, \ldots, N-1\}$ the distance metric $G_{ij}$ measures the distance from node i to node j in the appropriate units. The amount of memory available on memory node j is denoted by $\text{Mem}_j$.

A typical application program will typically not use all N memory nodes but will typically use a smaller number n, with $n \leq N$. To perform optimally, it is desirable for this subset of nodes $\{P_0, P_1, \ldots, P_{n-1}\}$, where $P \{0, 1, \ldots, N-1\}$, to conform to a requested geometry. A geometry parameter for a requested geometry with n nodes can be an $n \times n$ distance metric $g_{ij}$ with i,j an element of the set $\{0,1, \ldots n-1\}$. One or more optimal geometries can be found which represent solutions that minimize the following expression:

$$\sum_{i=0}^{n-1}\sum_{j=0}^{n-1} |G_{P_i P_j} - g_{ij}|^2 \quad (1)$$

over $\{P_0, P_1, \ldots, P_{n-1}\}$, which can range over all possible $$\frac{N!}{(N-n)!}.$$

Combinations of N memory nodes selected n at a time. In many cases there is also a minimal memory requirement which must be satisfied for each memory node. If $M_i$ is the minimal amount of memory required by the i'th requested node, then the minimal solution to Expression 1 must also satisfy: $M_i \leq \text{Mem}_{P_i}$, which is simply the requirement that there is enough available memory on the selected node.

For example, global geometry data can be a global geometry distance matrix $G_{ij}$ for a bristled DSM network having four routers and eight nodes (16 processors or half of network 202) is an 8 by 8 symmetric matrix. Values in the global geometry distance metric $G_{ij}$ represent the number of router traversals required to move data from node i to j. Thus, the global geometry distance metric $G_{ij}$ is given by:

$$G_{ij} = \begin{bmatrix} \begin{bmatrix} 0 & 1 \\ 1 & 0 \end{bmatrix} & \begin{bmatrix} 2 & 2 \\ 2 & 2 \end{bmatrix} & \begin{bmatrix} 2 & 2 \\ 2 & 2 \end{bmatrix} & \begin{bmatrix} 3 & 3 \\ 3 & 3 \end{bmatrix} \\ \begin{bmatrix} 2 & 2 \\ 2 & 2 \end{bmatrix} & \begin{bmatrix} 0 & 1 \\ 1 & 0 \end{bmatrix} & \begin{bmatrix} 3 & 3 \\ 3 & 3 \end{bmatrix} & \begin{bmatrix} 2 & 2 \\ 2 & 2 \end{bmatrix} \\ \begin{bmatrix} 2 & 2 \\ 2 & 2 \end{bmatrix} & \begin{bmatrix} 3 & 3 \\ 3 & 3 \end{bmatrix} & \begin{bmatrix} 1 & 0 \\ 0 & 1 \end{bmatrix} & \begin{bmatrix} 2 & 2 \\ 2 & 2 \end{bmatrix} \\ \begin{bmatrix} 3 & 3 \\ 3 & 3 \end{bmatrix} & \begin{bmatrix} 2 & 2 \\ 2 & 2 \end{bmatrix} & \begin{bmatrix} 2 & 2 \\ 2 & 2 \end{bmatrix} & \begin{bmatrix} 0 & 1 \\ 1 & 0 \end{bmatrix} \end{bmatrix}$$

Consider a memory configuration request for two memory nodes which share a router. In this case n=2 and $$g_{ij} = \begin{bmatrix} 0 & 1 \\ 1 & 0 \end{bmatrix}.$$

There are 56 possible pairs of memory nodes: (0,1), (0,2), (0,3), (0,4), (0,5), (0,6), (0,7), (1,0), (1,2), (1,3), (1,4), (1,5), (1,6), (1,7), (2,0), (2,1), (2,3), (2,4), (2,5), (2,6), (2,7), (3,0), (3,1), (3,2), (3,4), (3,5), (3,6), (3,7), (4,0), (4,1), (4,2), (4,3), (4,5), (4,6), (4,7), (5,0), (5,1), (5,2), (5,3), (5,4), (5,6), (5,7), (6,0), (6,1), (6,2), (6,3), (6,4), (6,5), (6,7), (7,0), (7,1), (7,2), (7,3), (7,4), (7,5), and (7,6) with 8 possible pairs which minimize Expression 1. The 8 solutions which minimize Expression 1 are: (0,1), (1,0), (2,3), (3,2), (4,5), (5,4), (6,7), and (7,6).

b. Resource Affinity

Often it is desirable for certain types of applications to be located near a particular node or set of nodes. Imagine an application which does a very large amount of I/O to a particular physical disk. It is clearly desirable that this application run on nodes as close as possible to the node where the disk is located. If there are m affinity nodes $a_j \in \{0,1, \ldots, N-1\}$ with $j \in \{0,1, \ldots, m-1\}$ and $m \leq n$ which desire to be as close as possible to the requested nodes $b_j \in \{0,1, \ldots, m-1\}$. If $\{P_0, P_1, \ldots, P_{n-1}\}$ is the solution minimizing Expression 1, the affinity requirement will also be satisfied if an affinity term can also be minimized. An affinity term can be written as follows:

$$\sum_{j=0}^{m-1} |G_{a_j P_{b_j}}|^2 \quad (2)$$

One possible solution is simply $P_{b_j}=a_j$. Expressions 1 and 2 can be combined into a single expression:

$$\alpha \sum_{i=0}^{n-1}\sum_{j=0}^{n-1} |G_{P_i P_j} - g_{ij}|^2 + (1-\alpha)\sum_{j=0}^{m-1} |G_{a_j P_{b_j}}|^2 \quad (3)$$

The parameter $\alpha \in [0, 1]$ is simply a weighting parameter (e.g., $\alpha=\frac{1}{2}$) which weighs between the global geometry and affinity term. A solution that minimizes Expression 3 can easily be found by simply enumerating all possible subsets of nodes $\{P_0, P_1, \ldots, P_{n-1}\}$.

c. Simplification with Boolean Cubes

The above formulation for determining optimal geometry can be greatly simplified by approximating the DSM network using Boolean cubes. In this case, there is no need to deal with a general global geometry distance metric $G_{ij}$ or a requested geometry distance metric $g_{ij}$ since they are implied and all solutions where Expression 1 is minimal can be easily found. Global geometry distance metric $G_{ij}$ or a requested geometry distance metric $g_{ij}$ are not needed because between any two memory nodes numbered i and j in a Boolean cube there is a network distance $G_{ij}$=Hamming (i⊕j). (⊕ is the bitwise exclusive -or operator). The Hamming distance is simply the count of the number of set bits in a word. To be precise, if $r_i$ are the binary digits of r such that $$r = \sum_{i=0}^{m-1} r_i 2^i,$$

then Hamming distance $$(r) = \sum_{i=0}^{m-1} r_i.$$

Here is an example of the simplified search for a Boolean cube. Consider the case of finding all possible imbedded Boolean 2-cubes in a 5-cube. Each node z in a 5-cube can be represented by its 5 binary digits: z=(z4, z3, z2, z1, z0). The number of 2 cube imbeddings is then all possible pairs of dimensions chosen out of 0, 1, 2, 3, 4. They are: (0,1) (0,2) (0,3) (0,4) (1,2) (1,3) (1,4) (2,3) (2,4) (3,4), so there are 10 possible imbeddings. For each of the 10 imbeddings there are 2^3=8 possible values for the other three dimensions which were not chosen. Secondly, once a solution is found, the search can terminate since all solutions are equivalent. When affinity values are supplied one can also order the search so that nodes in the affinity list are tried first.

Even if the underlying physical hardware is not a Boolean cube, it can nonetheless be approximated by a Boolean cube. In this way, the faster Boolean search algorithms can be used to find cube imbeddings.

Figure 4:
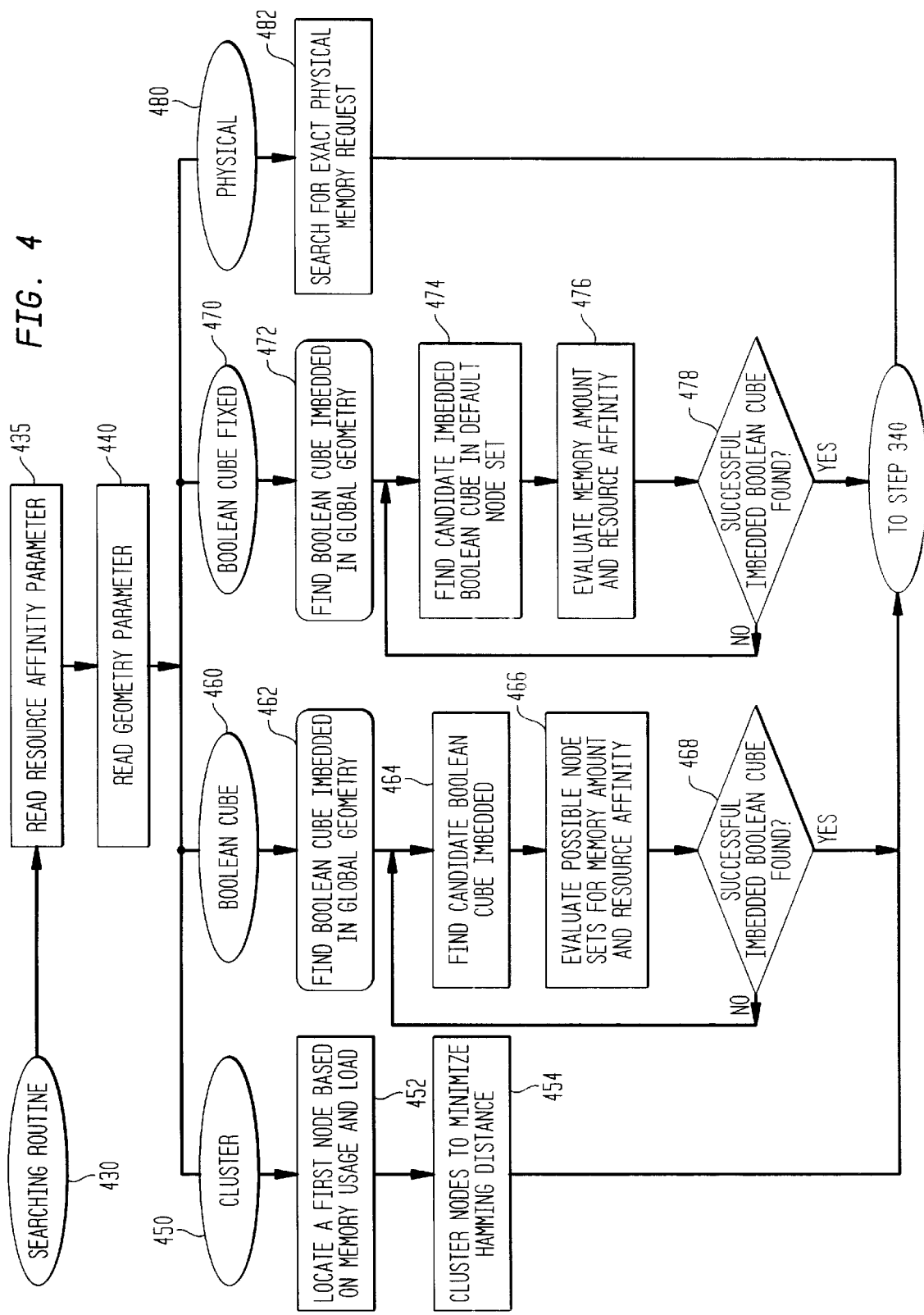
FIG. 4 is a flowchart of a routine for searching according to another embodiment of the present invention.

FIG. 4 shows a flowchart of a searching routine 430 according to another embodiment of the present invention. In this embodiment, a DSM network is approximated by Boolean cubes(s). The geometry parameter (also called a memory topology request in this embodiment) in the memory configuration request identifies a memory topology choice: cluster, Boolean cube Boolean cube fixed, or physical. In step 435, search module 115 reads memory resource affinity in the memory configuration request. The search then begins at a selected node determined based on CPU load, memory usage, or pseudo randomly. Preferably, the search begins at a first node having a resource such as an I/O device (printer, modem) as specified by the memory resource affinity parameter in step 435.

Search module 115 then reads the topology in geometry parameter (step 440). For example, the topology in the geometry parameter can include at least one of the following types of memory topologies: cluster (step 450), Boolean cube (step 460), Boolean cube fixed (step 470), and physical (step 480). If no memory topology is specified or if "cluster" is specified in the memory topology request, search module 115 begins the search at a selected first node (step 452). Search module 115 then expands the search to other nodes located close to the first node based on the global geometry data until a candidate node set is found. In this way, nodes are clustered to minimize Hamming distance (step 454).

If a Boolean cube memory topology is specified, search module 115 finds an embedded Boolean cube in the global geometry (stage 462). This stage 462 includes steps 464 to 468. First, search module 115 begins the search at a first node as described above. In step 464, the search is expanded to other nodes located close to the first node based on global geometry data until a candidate embedded Boolean cube node set is found. The candidate embedded Boolean cube node set consists of a Boolean cube embedded in the DSM network 130 having a number of nodes equal to the number of nodes specified in the memory configuration request.

Search module 115 then evaluates possible orientations of the candidate embedded Boolean cube for memory amount and resource affinity (step 466). In particular, search module 115 evaluates available memory amount for each node in the candidate embedded Boolean cube node set to determine whether a successful node set has been found. The step of evaluating available memory at each node can be performed on a per node basis as each node is searched to find a candidate node set, or on a per node basis after a candidate node set has been found to determine whether the candidate node set is a successful node set.

Search module 115 further evaluates resource affinity for each element in the resource affinity list for the candidate embedded Boolean cube node set to determine whether a successful node set has been found. The step of evaluating resource affinity at each node can be performed on a per node basis as each node is searched to find a candidate node set, or a per node basis after a candidate node set has been found to determine whether the candidate node set is a successful node set.

In step 468, when a successful embedded Boolean cube is found, search module 115 concludes its operation and proceeds to step 340. Otherwise, search module 115 proceeds to step 464 to find another candidate embedded Boolean cube. Steps 464 and 466 are then repeated until a successful embedded Boolean cube is found.

If a fixed Boolean cube memory topology is specified, search module 115 finds an embedded Boolean cube in the global geometry (stage 472), similar to the search performed in stage 462. A candidate embedded Boolean cube is found in a default node set (step 474). Memory amount and resource affinity of nodes in the candidate embedded Boolean cube are evaluated (step 476). However, other possible node sets of the embedded candidate Boolean cube do not have to be evaluated given the fixed Boolean cube memory topology that was specified. When a successful embedded Boolean cube is found, search module 115 terminates the search and proceeds to step 340. Otherwise, search module 115 returns to step 474 to find another candidate embedded Boolean in a default node set matching the fixed Boolean cube memory topology request.

If a physical memory topology is specified, search module 115 searches global geometry data for the specified physical memory topology as shown in stage 480 (step 482).

7. Example Imbedded Hypercube Search

The operation of searching routine 400 is described in even further detail with respect to an example search performed on a "bristled" mesh DSM network 700 (see FIGS. 5 to 9).

a. Preliminaries

On a NUMA system with $2n=2^{m+1}$ processors arranged in a "bristled" mesh network 700, there are $n=2^m$ distributed memories. Each local node n has a local memory and one hub. Every pair of hubs is always connected to a single router. There are always at least $$\frac{n}{2} = 2^{m-1}$$

routers. Processors are (virtually) numbered consecutively from 0, 1, . . . , 2n−1. Hubs are also (virtually) numbered consecutively from 0, 1, . . . , n−1. The processor labeled k has local memory on the hub labeled and this hub is connected directly to the router labeled $$\left[\frac{k}{4}\right].$$

When the number of local nodes or hubs n is between 0 and 32, 0<n≦32, there are routers, and for larger values of nodes 32<n there are more than $$\frac{n}{2}$$

routers. Some of these values are summarized in the table below.

TABLE 1

| Number of R10000 processors 2n | Number of memories or hubs n | Number of routers |
|---|---|---|
| 8 | 4 | 2 |
| 16 | 8 | 4 |
| 32 | 16 | 8 |
| 64 | 32 | 16 |
| 128 | 64 | 32 + 8(32) = 40(64) |

Routers that have hubs attached to them are numbered $$0, 1, \ldots, \frac{n}{2} = 2^{m-1}.$$

When 32<n the virtual router level is represented by routers with numbers greater than or equal to $$\frac{n}{2}.$$

Between any two memories numbered p and q, a router network naturally induces a distance metric d (p, q)=Hamming (p⊕q) between two memories (⊕ is the bit-wise exclusive-or operator). The Hamming distance is simply a count of the number of set bits in a word. To be precise, if $r_i$ are the binary digits of r so that $$\sum_{i=0}^{m-1} r_i,$$

then Hamming $$(r) = \sum_{i=0}^{m-1} r_i.$$

As the distance between two memories p and q increases, both the latency of data being transferred from p to q (or q to p) as well as the probability for resource contention increase. In terms of the binary digits of p and q, where $$p = \sum_{i=0}^{m-1} p_i 2^i$$

and $$q = \sum_{i=0}^{m-1} q_i 2^i,$$

the distance metric is $$d(p, q) = \sum_{i=0}^{m-1} p_i \oplus q^i.$$

b. Memory Regions: Topology Requests and Memory Affinity Requests

In one example, precise physical memory requirements can be specified such as: a) 2 Mbytes from physical memory number 3 and 256 kbytes from physical memory 7. In another example, looser requirements can be used like: b) 512 kbytes from each of the 4 memories on neighboring hubs without care as to where they are in the system. Another search possibility is: c) Mbyte from any seven memories as long as the memories are near a specified, e.g., location /dev/dsk/dks0d2s7.

These types of memory configuration requests are accommodated through a memory region. A memory region consists of a memory topology and a memory affinity. These are implemented through two mechanisms: (1) Memory Topology Requests, and (2) Memory Affinity Qualifiers.

C. Topology Requests

If the topology is specified as Cluster the location of a first node will be chosen based on CPU load, actual memory usage, or pseudo-randomly. Additional memory nodes will be clustered in order to minimize the Hamming distance between the nodes.

Memory topology requests specify how memories are arranged topologically. For example, topologies can include, but are not limited to, Cluster, Boolean Cube and Boolean Cube Fixed and Physical, as described with respect to routine 400.

If the topology is Boolean Cube then an attempt to find a Boolean cube of the appropriate dimension is made. There are $$\frac{m!}{k!(m-k)}(2^{m-k})!$$

ways to embed an oriented Boolean k-cube into a Boolean m-cube. This is easy to see. How many ways are there to choose the k out of m imbedded dimensions? This is the binomial coefficient $$\binom{m}{k} = \frac{m!}{k!(m-k)!}.$$

Once the m dimensions are chosen there are $2^{m-k}$ values for the other m−k dimension's coordinates.

Figure 5:
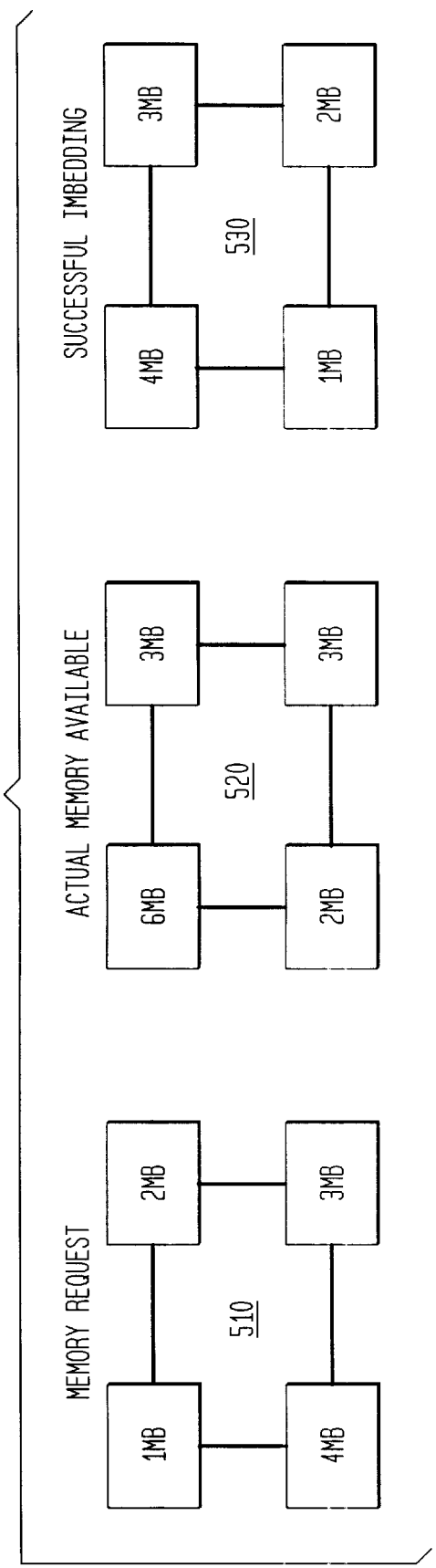
FIG. 5 is a diagram illustrating an example of a memory request, actual memory available, and successful imbedding according to the present invention.

For each candidate imbedding, if the memory is not found in the default node set, and if enough memory is available, the search continues overall possible node sets of the Boolean k-cube. Referring now to FIG. 5, consider the simple example memory request 510 for a topology that is a Boolean 2-cube (a square). In this case, there are eight possible imbeddings of four memories arranged in a square with memory requirements of 1 MByte, 2 Mbytes, 3 Mbytes and 4 Mbytes 520. Only one successful imbedding 530 is possible.

Figure 6:
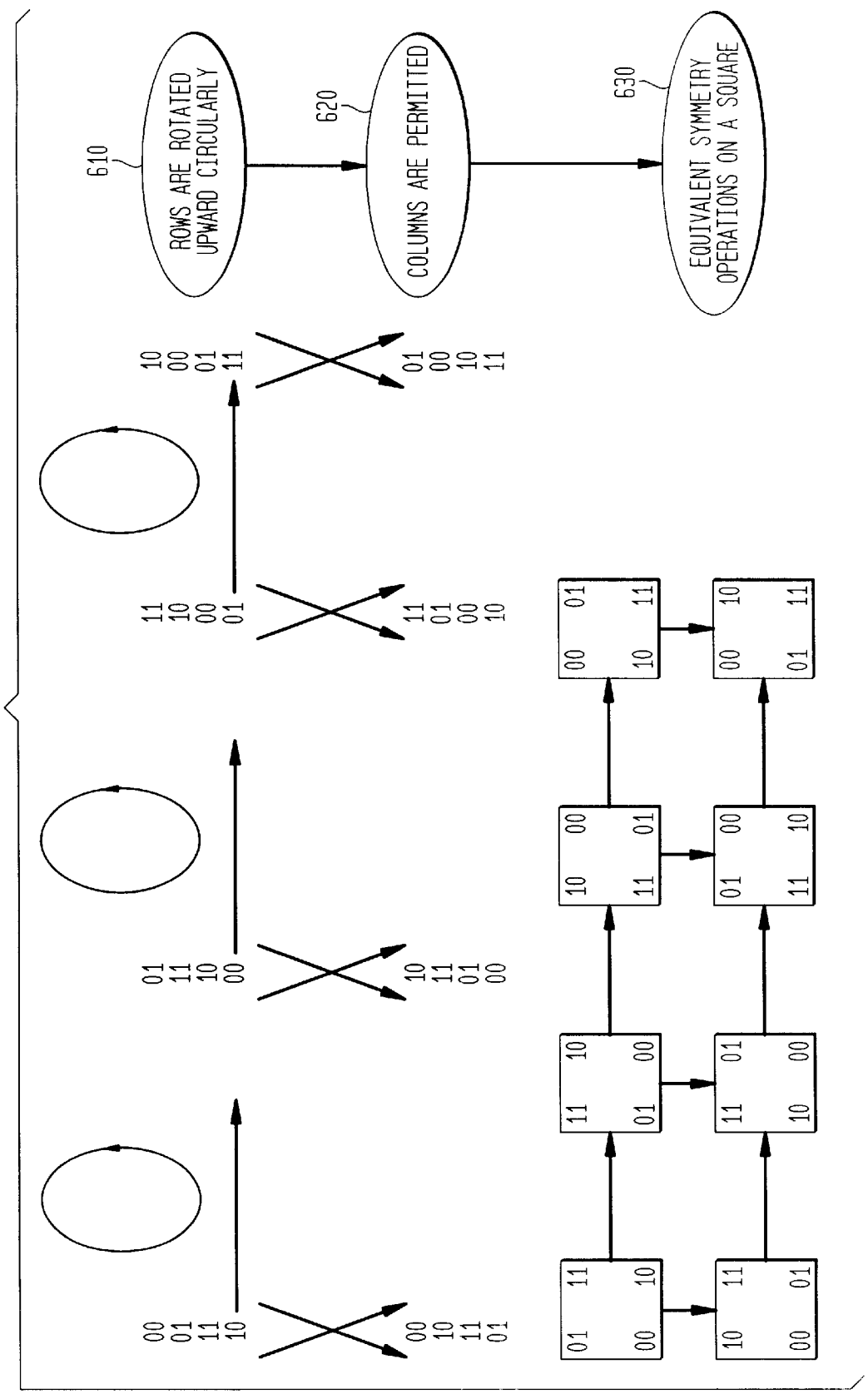
FIG. 6 is a diagram illustrating an example of the generation of candidate Boolean cube node sets according to the present invention.

To find all possible imbeddings it is necessary to generate all possible symmetry operations for a Boolean k-cube. The symmetry group (*Regular Polytopes*, H. S. M. Coxeter, 3rd Edition, Dover, 1993), for a Boolean k-cube has a dimension $k! \times 2^k$. As shown in FIG. 6, the Boolean k-cube can be generated quite rapidly by first generating the reflected gray code table for the Boolean k-cube and by cyclically rotting all rows of the table followed by permuting the table's columns (step 610). There are k columns with k! possible permutations and $2^k$ rows with $2^k$ possible starting positions (step 620). These $8=2! \times 2^2$ configurations correspond with the eight ways to view a square: 4 node sets having orientations generated by 90 degree rotations as well as these same 4 rotations of the original square after it is reflected through the major diagonal (step 630).

The Boolean 3-cube has $48=3! \times 2^3$ different possible orientations. There are $8=2^3$ possible positions to put vertex 000 and there are $6=3!$ ways to permute the orientation of the 3 neighboring vertices which are neighbors to 000 (that is 100,010 and 001). For higher dimensions this construction is a harder to visualize, but the construction is identical.

If the topology is Boolean Cube Fixed then an attempt to find a Boolean cube in the requested orientation only is made. No symmetry operations on the Boolean cube is performed. This request makes sense if all nodes need the same amount of memory, because nothing is gained by trying different symmetry operations.

If the topology is Physical then an attempt to find the exact physical memory request is made.

These topology types are summarized in the table below.

TABLE 2

Memory topology request functionality

| Topology Request | Meaning |
|---|---|
| Cluster | closely clustered nodes |
| Boolean Cube | find a Boolean cube with any orientation to satisfy user memory requirements |
| Boolean Cube Fixed | find a Boolean cube with fixed orientation to satisfy user memory requirements |
| Physical | find memory which exactly satisfies user requested criterion | d. Memory Affinity

Memory affinity qualifiers (also called the resource affinity parameter above) are hints given by the user to the physical memory allocator to search for physical memories that are close to specified regions within the system. These regions can consist of physical input/output (I/O) devices (e.g., printers, modems, displays, peripherals), and in general they could be processes or any other type of object that exhibits spatial locality. These qualifiers consist of a list of objects (I/O device names) and for each list element there is also an associated memory affinity qualifier. The qualifier can be, for example, NONE or NEAR.

If the memory affinity qualifier for a given object is NONE, no attempt is made to make the placement based on this object.

If the memory affinity qualifier for a given object is NEAR, the memory is attempted to be allocated as close as possible to the hub(s) associated with this object(s); in other words, the memory is attempted to be allocated with at least one memory node residing on the same hub that is associated with the first object. These requests are summarized in the table below.

TABLE 3

Memory Affinity Request Functionality

| Memory Affinity Request | Meaning |
|---|---|
| NONE | no attempt is made to make the placement based on the associated object |
| NEAR | memory is attempted to be allocated as close as possible to the associated object(s) |

Note that these memory affinity requests are examples that can be used in a preferred embodiment. Other qualifiers and ranges for memory resource affinity can be used according to the present invention.

e. Searching for Available Memory

Search routines 300, 400 look for requested memory configurations. These searches can be optimistic searches which terminate quite quickly if resources are available. In contrast, thorough searches could enumerate all possible configurations and chose one which minimizes appropriate distance metrics.

The starting search location is chosen using heuristics based on memory usage and average load information (initially this will be pseudo-random). This technique avoids having preferred regions which would soon run out of memory. The memory search is organized by starting at a fixed point and expanding outward on surfaces of constant Hamming distance from the initial search position. The lowest order bits are examined first since hubs which have a common routes are closer than ones that do not, and meta-level routers never come into play until the 6th address bit is reached. Table 4 below is a table of the number of memory node and distance from a source.

TABLE 4

Number of Memories That Are a Hamming Distance Away From Any Node for Bristled DSM Systems with 4, 8, 16 and 32 Hubs (8,16,32 and 64 Processors)

| d | n = d | n = 8 | n = 16 | n = 32 |
|---|---|---|---|---|
| 0 | 1 | 1 | 1 | 1 |
| 1 | 1 | 1 | 1 | 1 |
| 2 | 2 | 4 | 6 | 8 |
| 3 | 0 | 2 | 6 | 12 |
| 4 | 0 | 0 | 2 | 8 |
| 5 | 0 | 0 | 0 | 2 |

Figure 7:
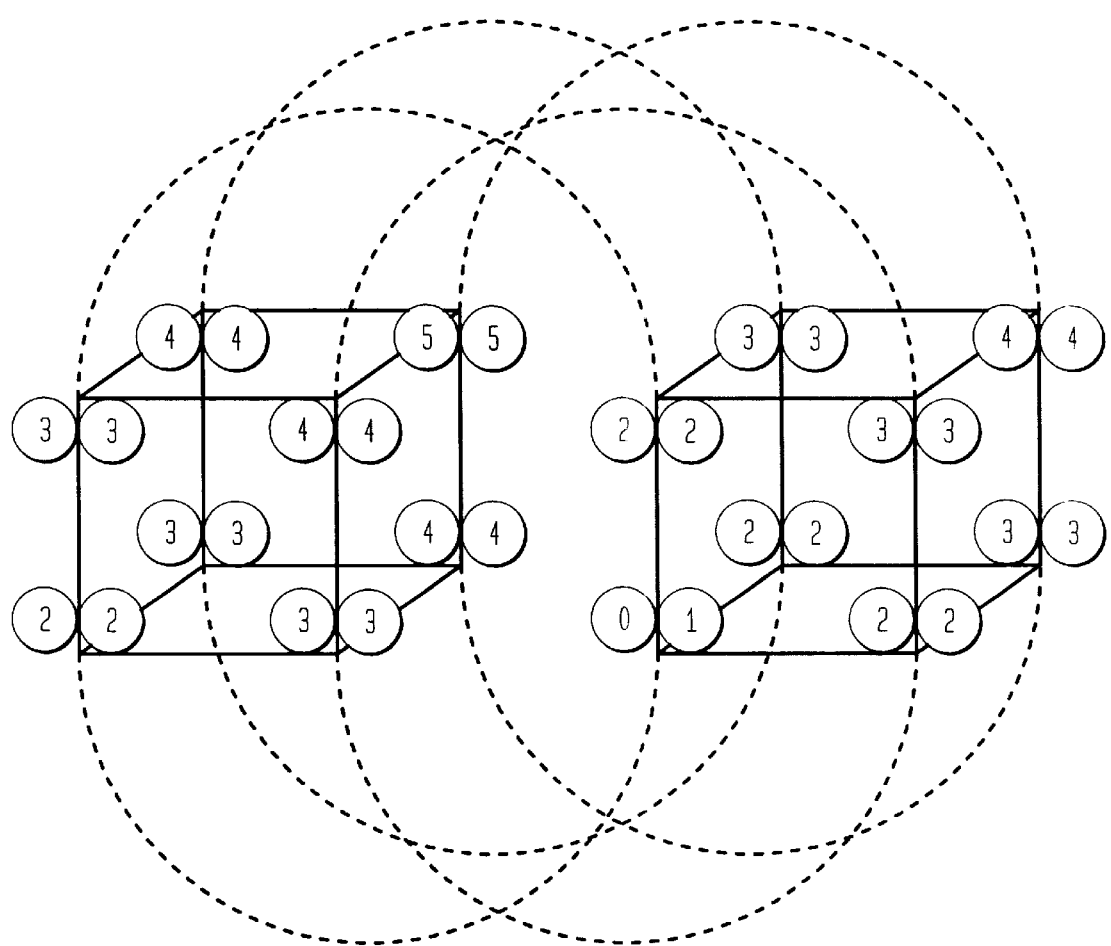
FIG. 7 is a diagram illustrating an example 64 processor configuration and inter-node Hamming distance.

FIG. 7 shows a bristled DSM network 700 having 32 memory node (64 processors) configuration with memory nodes labeled by their Hamming distance from the node labeled 0.

When resource affinity is requested, the starting search location is chosen to be a memory node contained within the first object (I/O device) in the list. As before, the search is organized to expand radially on surfaces of constant Hamming distance, but in this case the dimensions are ordered such that the dimensions associated with other memory nodes that are represented in a resource affinity list are searched first. In this way, configurations are first sought out which are closer to the other devices, but at the same time close to the initial search position.

8. Higher Level Memory Topology Specification

People and compilers do not usually work in the world of Boolean k-cubes. Most applications and computer languages work instead with rectilinear arrays. Fortunately, rectilinear arrays can always be imbedded in a Boolean k-cube of sufficiently large dimension in such a way that nearest neighbors in the rectilinear array are at most one edge away in the Boolean k-cube.

Figure 8:
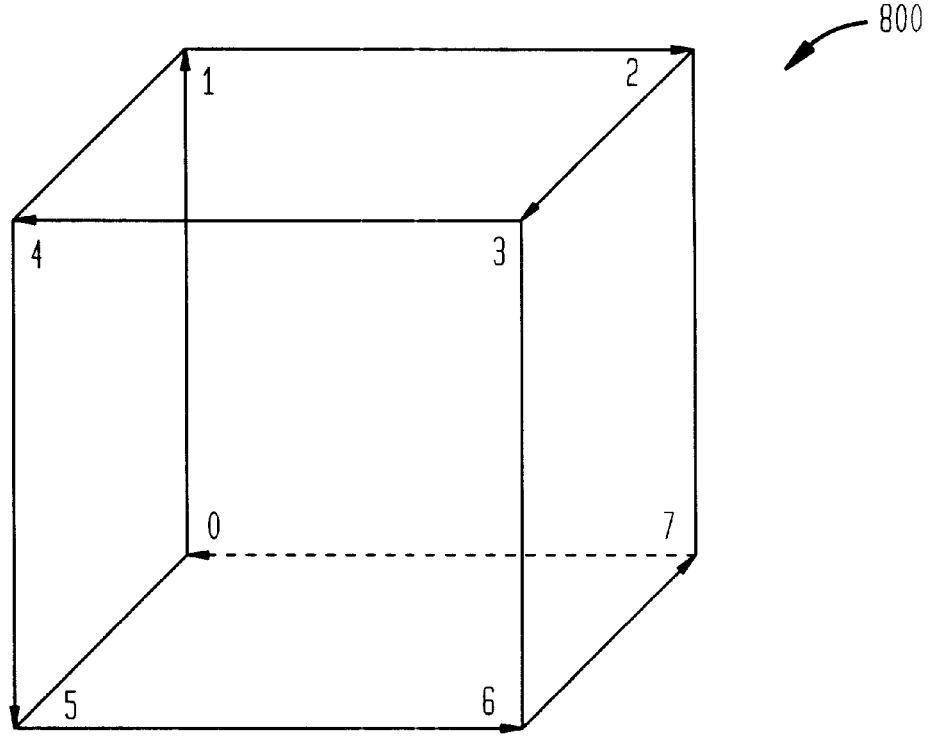
FIG. 8 is a diagram illustrating an example Gray code imbedding of a periodic axis.
Figure 9:
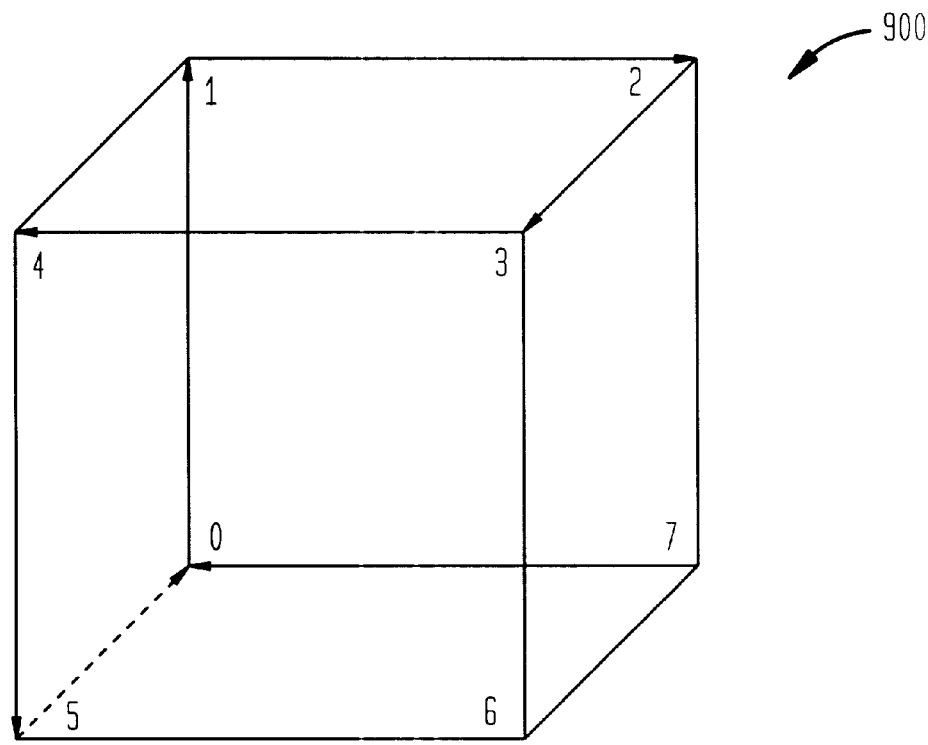
FIG. 9 is a diagram illustrating an example Gray code imbedding of a non-periodic axis and a periodic axis.

It is well known, that periodic axes which are powers of two in length can be imbedded into a hypercube using gray coding such that nearest neighbors in the array are also nearest neighbors in the hypercube. See, Kumar et al., *Introduction to Parallel Computing* (Benjamin Cummings Pub.: Redwood City, Calif.) pp. 30–45, 1994 (incorporated herein by reference). For example, a periodic axis of length 8 can be imbedded optimally using: 0-1-2-3-4-5-6-7->000-001-011-111-101-100-110-010, as shown in FIG. 8.

Unfortunately, not all axes lengths are powers of 2, but gray code imbedding for non-periodic axes can still be used. A non-periodic axis of length can be optimally imbedded many ways, for example: 0-1-2-3-4->000-001-011-111-101 which is seen in the thick lines in FIG. 9. Examining FIG. 9, one can see that a periodic axis of length 6 can also be imbedded optimally using 0-1-2-3-4-5->000-001-011-111-101-100.

For an arbitrary rank rectilinear arrays, separate axes can be gray code imbedded by choosing separate subcubes for each appropriate dimension. For example, a 5×3 grid can be imbedded so that the 5 is gray coded into the first 2×2×2 cube and the three is gray coded into the next 2×2 cube, or 5×3->(2×2×2)×(2×2). Nearest neighbors in the 5×3 array are at most on edge away in the hypercube.

A library interface can be provided for users and compilers requesting rectilinear arrays of memory.

9. Example Multiprocessor Memory Management Environment

Given the description herein, it would be apparent to one skilled in the relevant art how to implement the present invention in any computer system supporting single-thread and multi-thread application or operating system processes including, but not limited to, a single processor or multiprocessor system. See, e.g., the multithreaded and multiprocessor systems in Catanzaro, "*Multiprocessor System Architectures: A Technical Survey of Multiprocessor/Multithreaded Systems Using SPARC®, Multilevel Bus Architectures, and Solaris® (SunOS)™,*" (Sun Microsystems, Inc.: U.S.A. 1994) (incorporated in its entirety herein by reference); D. Lenoski and W. Weber, "*Scalable Shared-Memory Multi-Processing,*" (Morgan-Kaufmann Publ.: U.S.A. 1995), (incorporated in its entirety herein by reference); Hennessy and Patterson, at Chapter 8, "Multiprocessors," pp. 634–760 (incorporated herein by reference); K. Hwang, "*Advanced Computer Architecture: Parallelism, Scalability and Programmability,*" (McGraw-Hill Inc.: U.S.A. 1993), (incorporated in its entirety herein by reference); and G. Coulouris et al., "*Distributed Systems: Concepts and Designs,*" 2nd. Ed. (Addison-Wesley Publ.: U.S.A. 1994), (incorporated in its entirety herein by reference).

In one preferred example, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif.

Figure 10:
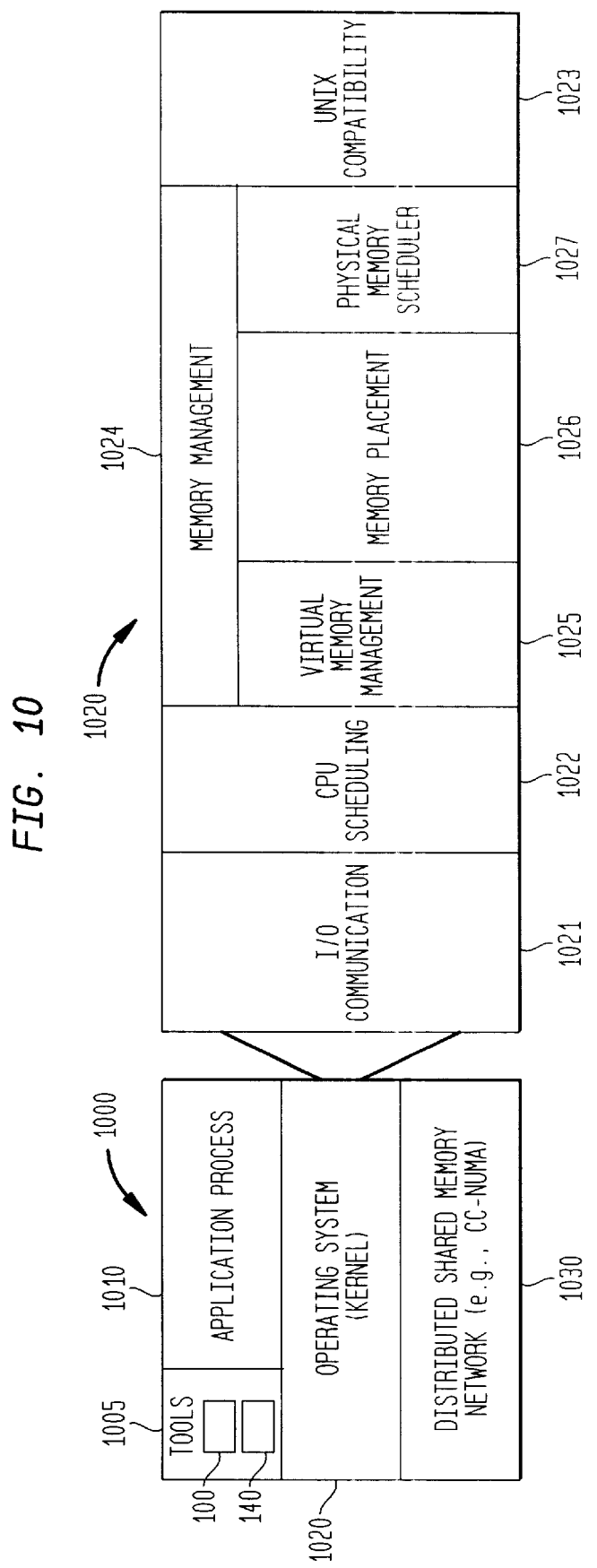
FIGS. 10, 11, and 12 are diagrams of a multiprocessor memory management system used in one operating system implementation of the present invention.
Figure 11:
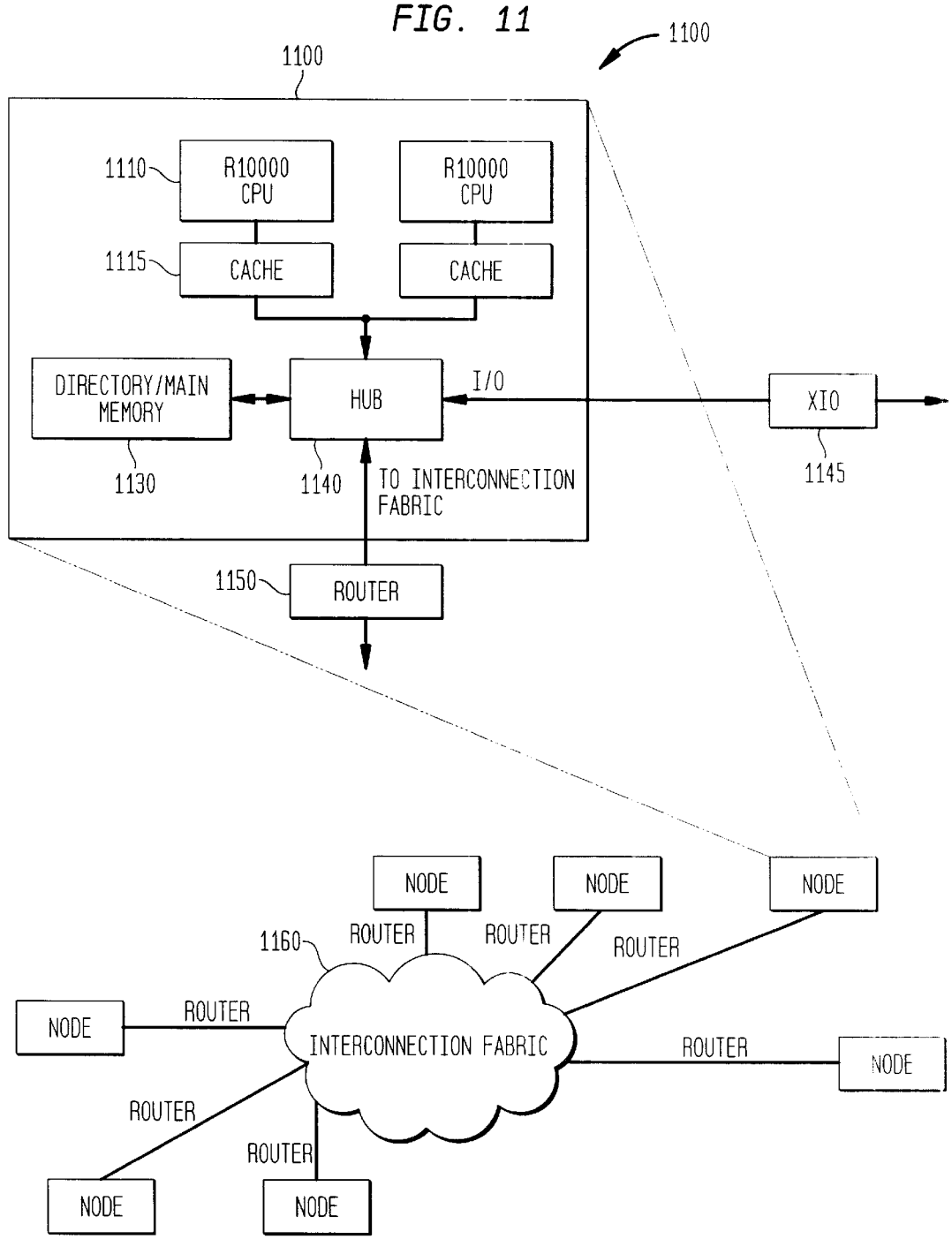
Figure 12:
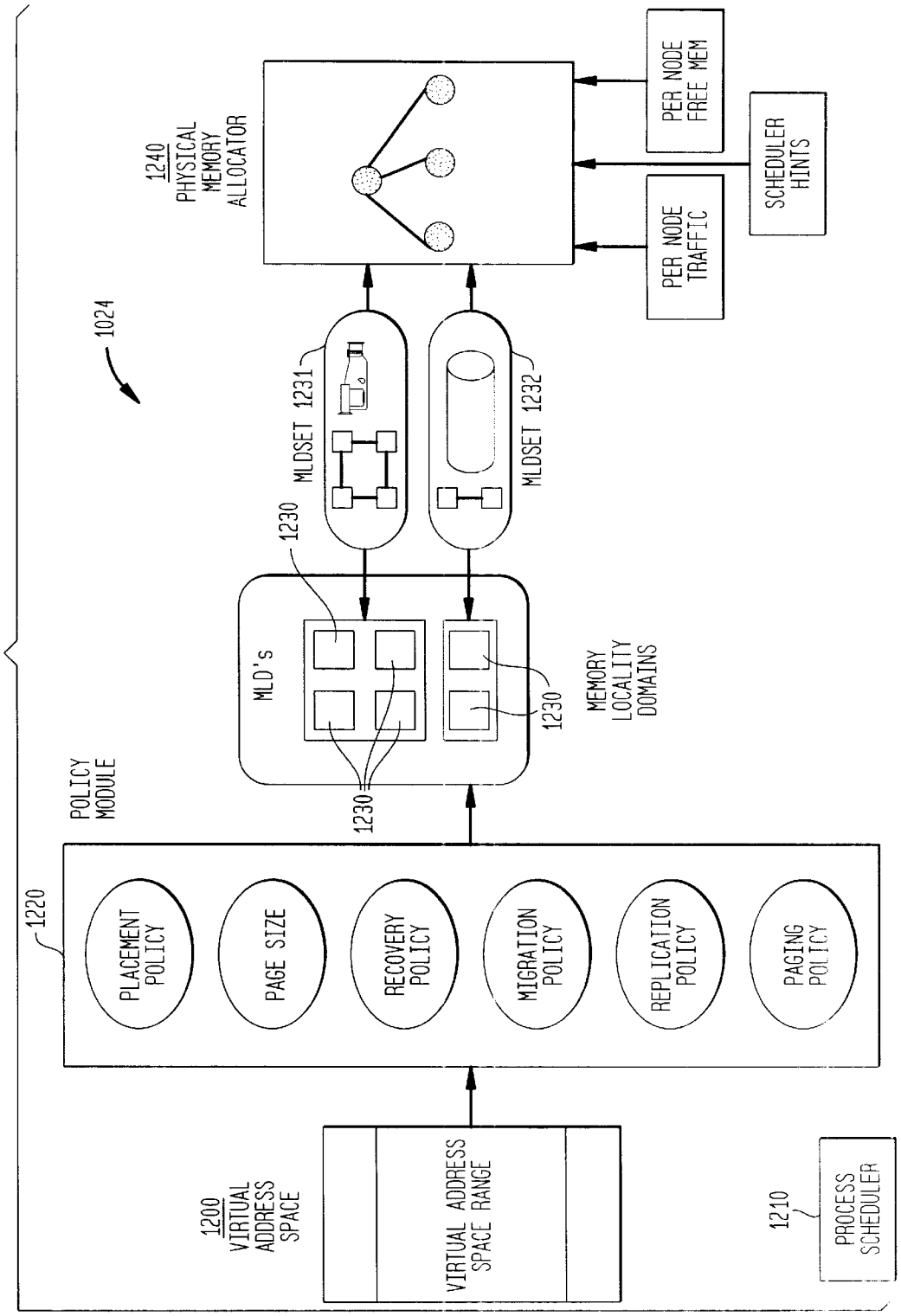

FIGS. 10 to 12 are diagrams of a multiprocessor system according to one preferred implementation of the present invention. As shown in FIG. 10, multiprocessor system 1000 includes tools 1005, application processes 1010 and operating system (kernel) 1020 which run on a distributed shared memory (DSM) network 1030. Tools 405 can include a virtual memory access profiling tool as described in further detail in commonly-owned, co-pending application by J. L. Richardson, "Method, System, and Computer Program Product for Profiling Thread Virtual Memory Accesses," (Appl. No. to be assigned, Attorney Docket No. 15-4-469.00), filed Aug. 14, 1997, and incorporated herein by reference in its entirety. In one preferred example, DSM network 1030 is a scalable, cache-coherent, directory-based non-uniform memory access (CC-NUMA) multi-node network as used in Origin 200 and Origin 2000 machines, manufactured by Silicon Graphics, Inc., Mountain View, Calif.

As shown in FIG. 11, DSM network 1030 has a hardware topology consisting of multiple nodes 1100 coupled by routers 1150 to an interconnection fabric 1160, also called an interconnection network. Each node 1100 has one or more local processors 1110 and a local memory 1130 coupled to a hub 1140. For example, node 1100 has two R10000 CPUs 1110, respective caches 1115, a directory-based main memory 1130, and a hub 1140. Hub 1140 is further coupled to an external I/O device 1145 and to a router 1150. DSM network 1030 can scale cost-effectively and without significant degradation of performance to any number of processors including, but not limited to, a number of processors in a range between 1 to 256 processors. Operating system 1020 supports I/O communication 1021, CPU scheduling 1022, UNIX compatibility 1023, and memory management 1024. For example, UNIX compatibility 1023 can provide compatibility between operating system 1020 processes and UNIX System V, Release 4 processes. See, B. Goodheart and J. Cox, "*The Magic Garden Explained, The Internals of UNIX System V Release 4, An Open Systems Design,*" (Prentice-Hall: Australia 1994), pp. 1 to 279 (incorporated by reference herein). Operating system 1020 can be compatible with other operating systems (e.g., MS-DOS), languages, libraries, databases, file systems, and communication protocols.

Operating system 1020 further provides memory management 1024 which is responsible for virtual memory management 1025, memory placement 1026, and physical memory scheduling 1027. As shown in further detail in FIG. 12, memory management 1024 includes two memory management mechanisms: memory locality domains (MLDs) 1230 and policy modules 1220. MLDs 1230 are, inter alia, a mechanism for providing a memory configuration request. Two or more MLDs 1230 can be grouped together in a MLD set 1231, 1232. Policy module(s) 1220 are used in conjunction with MLDs 1230 and/or MLDsets 1231, 1232. In one example, policy module(s) 1220 include modules for setting placement policy, page size, recovery policy, migration policy, replication policy, and paging policy. See, the commonly-owned, co-pending application by L. Stevens, "Method, System, and Computer Program Product for Defining Initial Memory Placement in a Non-Uniform Memory Access System," (Appl. No. to be assigned, Attorney Docket No. 15-4-462.00), filed concurrently herewith and incorporated herein by reference in its entirety.

10. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer program product comprising a computer useable medium having computer program logic recorded thereon for enabling a processor to allocate physical memory in a distributed shared memory (DSM) system, the DSM system having a plurality of nodes coupled by an interconnection network, each node having one or more local processors and a local memory, said computer program logic comprising:

means for enabling the processor to store global geometry data that defines a global geometry of the nodes in the DSM network;

means for enabling the processor to receive a memory configuration request having parameters that define at least one of a geometry, memory amount, and resource affinity; and means for enabling the processor to search for a set of the nodes in the DSM network that fulfills said memory configuration request based on said global geometry data, including means for enabling the processor to search for a set of the nodes in the DSM network representing a solution that minimizes the following expression:

$$\alpha \sum_{i=0}^{n-1} \sum_{j=0}^{n-1} |G_{P_i P_j} - g_{ij}|^2 + (1-\alpha) \sum_{j=0}^{m-1} |G_{a_i P_{b_j}}|^2$$

over a subset of nodes $\{P_0, P_1, \ldots, P_{n-1}\}$, which can range over combinations of N memory nodes selected n at a time; where N is the number of nodes in the global geometry data G; n is the number of nodes in a geometry g specified in the memory configuration request, m is the number of nodes having a resource affinity in the global geometry, and $\alpha$ is a weighting factor; whereby physical memory address space can be distributed across said set of nodes in the DSM network in accordance with said memory configuration request.

2. A method for allocating physical memory in a distributed shared memory (DSM) system, the DSM system having a plurality of nodes coupled by an interconnection network, each node having one or more local processors and a local memory, the method comprising the steps of:

(a) storing global geometry data that defines a global geometry of the nodes in the DSM network;

(b) receiving a memory configuration request having parameters that define at least one of a geometry, memory amount, and resource affinity; and (c) searching for a set of the nodes in the DSM network that fulfills the memory configuration request based on the global geometry data, comprising the step of searching for a set of the nodes in the DSM network representing a solution that minimizes the following expression:

$$\alpha \sum_{i=0}^{n-1} \sum_{j=0}^{n-1} |G_{P_i P_j} - g_{ij}|^2 + (1-\alpha) \sum_{j=0}^{m-1} |G_{a_i P_{b_j}}|^2$$

over a subset of nodes $\{P_0, P_1, \ldots, P_{n-1}\}$, which can range over combinations of N memory nodes selected n at a time; where N is the number of nodes in the global geometry data G; n is the number of nodes in a geometry g specified in the memory configuration request, m is the number of nodes having a resource affinity in the global geometry, and $\alpha$ is a weighting factor; whereby, physical memory address space can be distributed across the set of nodes in accordance with the memory configuration request.

3. The method of claim 2, wherein the global geometry data includes node—node distance data defining network distances between the nodes for the global geometry of the DSM network, and wherein said storing step comprises the step of storing the node-node distance data.

4. The method of claim 2, wherein the global geometry data further includes node-resource affinity data defining resources associated with nodes in the global geometry of the DSM network, and wherein said storing step comprises the step of storing the node-resource affinity data.

5. The method of claim 2, wherein said searching step comprises the step of searching for a set of the nodes within the DSM network, wherein the set of nodes represent nodes arranged in a configuration within the DSM network that fulfills the geometry parameter in the memory configuration request.

6. The method of claim 5, wherein said searching step further comprises the step of checking whether the available memory amount of each node in the node set is at least equal to the memory amount parameter in the memory configuration request.

7. The method of claim 5, wherein said searching step further comprises the step of evaluating resource affinity of each node in the node set to determine whether each node is within a network distance of a resource as specified by the resource affinity parameter in the memory configuration request.

8. The method of claim 2, further comprising the step of permitting a user to specify a memory configuration request that includes the topology for a number of nodes and to select from at least one of the following types of topologies: cluster, Boolean cube, Boolean cube fixed, and physical.

9. The method of claim 8, further comprising the steps of:

reading the geometry parameter requested in the memory configuration request, wherein, if a cluster topology is specified, said searching step comprises the steps of:

locating a first node; and expanding the search radially from the first node to other nodes located close to the first node based on said global geometry data until a candidate node set is found consisting of a number of nodes equal to the number of nodes specified in the geometry parameter of the memory configuration request.

10. The method of claim 9, wherein said searching step further comprises the step of evaluating available memory amount for each node in the candidate node set to determine whether a successful node set has been found.

11. The method of claim 9, wherein said searching step further comprises the step of evaluating resource affinity for each element in a resource affinity list for the candidate node set to determine whether a successful node set has been found.

12. The method of claim 8, further comprising the step of reading the memory configuration request, wherein, if a Boolean cube topology is specified; and said searching step includes the step of finding a candidate imbedded Boolean cube node set having a number of nodes equal to the number of nodes specified in the memory configuration request.

13. The method of claim 12, wherein said searching step further comprises the step of evaluating available memory amount for each node in the candidate imbedded Boolean cube node set to determine whether a successful candidate imbedded Boolean cube node set has been found.

14. The method of claim 12, wherein said searching step further comprises the step of evaluating resource affinity for each element in a resource affinity list for the candidate imbedded Boolean cube node set to determine whether a successful candidate imbedded Boolean cube node set has been found.

15. The method of claim 8, further comprising the steps of:
reading said memory configuration request, wherein, if a fixed Boolean cube topology is specified, said searching step comprises the steps of:
finding a candidate imbedded Boolean cube node set in a default orientation having a number of nodes equal to the number of nodes specified in the memory configuration request;
evaluating memory amount for each node in the candidate imbedded Boolean cube node set; and
evaluating resource affinity for each element in a resource affinity list for the candidate imbedded Boolean cube node set to determine whether a successful candidate imbedded Boolean cube node set has been found.

16. The method of claim 8, further comprising the steps of:
reading the memory configuration request, wherein, if a physical topology is specified, said searching step comprises the step of searching said global geometry data for the specified physical topology.

17. The method of claim 2, further comprising the steps of:
locating a first node in the DSM network having relatively low CPU load or memory usage; and
beginning a search in said searching step at the first node.

18. The method of claim 2, further comprising the steps of:
locating a first node in the DSM network pseudo-randomly; and
beginning a search in said searching step at the first node.

19. The method of claim 2, further comprising the step of storing a resource affinity list that lists resource affinity for a number of nodes.

20. The method of claim 19, wherein said searching step comprises the step of finding nodes located within a network distance of a resource in accordance with the resource affinity specified in the memory configuration request.

21. The method of claim 20, wherein said searching step further comprises the step of reading the resource affinity list to determine whether a node being searched is located within an appropriate network distance range of a resource as specified in the memory configuration request.

22. A system for allocating physical memory in a distributed shared memory (DSM) system, the DSM system having a plurality of nodes coupled by an interconnection network, each node having one or more local processors and a local memory, the system comprising:
storing means for storing global geometry data that defines a global geometry of the nodes in the DSM network;
receiving means for receiving a memory configuration request having parameters that define at least one of a geometry, memory amount, and resource affinity; and
searching means for searching for a set of the nodes in the DSM network that fulfills the memory configuration request based on the global geometry data, said searching means searching for a set of the nodes in the DSM network representing a solution that minimizes the following expression:

$$\alpha \sum_{i=0}^{n-1}\sum_{j=0}^{n-1} |G_{P_i P_j} - g_{ij}|^2 + (1-\alpha)\sum_{j=0}^{m-1} |G_{a_i P_{b_j}}|^2$$

over a subset of nodes $\{P_0, P_1, \ldots, P_{n-1}\}$, which can range over combinations of N memory nodes selected n at a time; where N is the number of nodes in the global geometry data G; n is the number of nodes in a geometry g specified in the memory configuration request, m is the number of nodes having a resource affinity in the global geometry, and $\alpha$ is a weighting factor; whereby physical memory address space can be distributed across the set of nodes in the DSM network in accordance with the memory configuration request.

23. The system of claim 22, wherein the global geometry data includes node—node distance data defining network distances between the nodes for the global geometry of the DSM network, and wherein said storing means stores said node-node distance data.

24. The system of claim 22, wherein the global geometry data further includes node-resource affinity data defining resources associated with nodes in the global geometry of the DSM network, and wherein said storing means stores said node-resource affinity data.

25. The system of claim 22, wherein said searching means comprises means for searching for a set of the nodes within the DSM network, wherein the set of nodes represent nodes arranged in a local configuration within the DSM network that fulfills the geometry parameter in the memory configuration request.

26. The system of claim 25, wherein said searching means further comprises means for checking whether the available memory amount of each node in the node set is at least equal to the memory amount parameter in the memory configuration request.

27. The system of claim 25, wherein said searching means further comprises means for evaluating resource affinity of each node in the node set to determine whether each node is within a network distance of a resource as specified by the resource affinity parameter in the memory configuration request.

28. The system of claim 22, further comprising means for permitting a user to specify a memory configuration request that includes the topology for a number of nodes and to select from at least one of the following types of topologies: cluster, Boolean cube, Boolean cube fixed, and physical.

29. The system of claim 28, further comprising:
means for reading the memory configuration request; and wherein, if cluster topology is read, said searching means locates a first node and expands the search radially from the first nodes to other nodes located close to the first node based on the global geometry data until a candidate node set is found consisting of a number of nodes equal to the number of nodes specified in the memory configuration request.

30. The system of claim 29, wherein said searching means further comprises means for evaluating available memory amount for each node in the candidate node set to determine whether a successful node set has been found.

31. The system of claim 29, wherein said searching means further comprises means for evaluating resource affinity for each element in a resource affinity list for the candidate node set to determine whether a successful node set has been found.

32. The system of claim 28, further comprising means for reading the memory configuration request, wherein, when a Boolean cube memory topology is specified said searching means finds a candidate imbedded Boolean cube node set having a number of nodes equal to the number of nodes specified in the memory configuration request.

33. The system of claim 32, wherein said searching means further comprises means for evaluating available memory amount for each node in the candidate imbedded Boolean cube node set to determine whether a successful candidate imbedded Boolean cube node set has been found.

34. The system of claim 32, wherein said searching means further comprises means for evaluating resource affinity for each element in a resource affinity list for the candidate imbedded Boolean cube node set to determine whether a successful candidate imbedded Boolean cube node set has been found.

35. The system of claim 28, further comprising:
means for reading the memory configuration request, wherein, if a fixed Boolean cube topology is specified, said searching means finds a candidate imbedded Boolean cube node set in a default orientation having a number of nodes equal to the number of nodes specified in the memory configuration request.

36. The system of claim 28, further comprising:
means for reading the memory configuration request, wherein, when a physical topology is specified, said searching means searches the global geometry data for the specified physical topology.

37. The system of claim 22, further comprising:
means for locating a first node in the DSM network having relatively low CPU load or memory usage; and
means for beginning a search performed by said searching means at the first node.

38. The system of claim 22, further comprising:
means for locating a first node in the DSM network pseudo-randomly and
means for beginning a search performed by said searching means at the first node.

39. The system of claim 22, further comprising means for storing a resource affinity list that lists resource affinity for a number of nodes.

40. The system of claim 39, wherein said searching means comprises means for finding nodes located within a network distance of a resource in accordance with the resource affinity specified in the memory configuration request.

41. The system of claim 40, wherein said searching means further comprises means for reading the resource affinity list to determine whether a node being searched is located within an appropriate network distance range of a resource specified in the memory configuration request.

42. A system for allocating physical memory in a distributed shared memory (DSM) system, the DSM system having a plurality of nodes coupled by an interconnection network, each node having one or more local processors and a local memory, the system comprising:

a storage device that stores global geometry data that defines a global geometry of the nodes in the DSM network;

a search module that searches in response to a received memory configuration request having parameters that define at least one of a geometry, memory amount, and resource affinity for a set of the nodes in the DSM network that fulfills the memory configuration request based on the global geometry data, wherein said search module searches for a set of the nodes in the DSM network representing a solution that minimizes the following expression:

$$\alpha \sum_{i=0}^{n-1} \sum_{j=0}^{n-1} |G_{P_i P_j} - g_{ij}|^2 + (1-\alpha) \sum_{j=0}^{m-1} |G_{a_i P_{b_j}}|^2$$

over a subset of nodes $\{P_0, P_1, \ldots, P_{n-1}\}$, which can range over combinations of N memory nodes selected n at a time; where N is the number of nodes in the global geometry data G; n is the number of nodes in a geometry g specified in the memory configuration request, m is the number of nodes having a resource affinity in the global geometry, and $\alpha$ is a weighting factor; whereby physical memory address space can be distributed across said set of nodes in the DSM network in accordance with said memory configuration request.

* * * * *